US009727877B2

(12) United States Patent
Rosler et al.

(10) Patent No.: US 9,727,877 B2
(45) Date of Patent: Aug. 8, 2017

(54) METHOD AND SYSTEM FOR DYNAMIC MESSAGING

(75) Inventors: Daniel Benjamin Rosler, Belmont, CA (US); Jennifer Ann Cantele, Los Altos Hills, CA (US); Amit Sharma, Santa Clara, CA (US); Daniel Aaron Issen, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 1409 days.

(21) Appl. No.: 11/829,511

(22) Filed: Jul. 27, 2007

(65) Prior Publication Data
US 2009/0030786 A1 Jan. 29, 2009

(51) Int. Cl.
*G06Q 30/02* (2012.01)
*G06Q 30/06* (2012.01)

(52) U.S. Cl.
CPC ......... *G06Q 30/02* (2013.01); *G06Q 30/0211* (2013.01); *G06Q 30/0224* (2013.01)

(58) Field of Classification Search
USPC .......... 705/14.25, 14.36, 14.4, 14.49, 14.53, 705/14.55, 14.66, 14.67, 14.73
See application file for complete search history.

(56) References Cited

U.S. PATENT DOCUMENTS

| | | | |
|---|---|---|---|
| 6,269,325 B1 | 7/2001 | Lee et al. | |
| 6,317,752 B1 | 11/2001 | Lee et al. | |
| 6,542,894 B1 | 4/2003 | Lee et al. | |
| 6,782,390 B2 | 8/2004 | Lee et al. | |
| 6,853,982 B2 | 2/2005 | Smith et al. | |
| 7,024,374 B1 * | 4/2006 | Day | G06Q 30/02 705/14.25 |
| 7,039,599 B2 | 5/2006 | Merriman et al. | |
| 7,113,917 B2 | 9/2006 | Jacobi et al. | |
| 2001/0021914 A1 * | 9/2001 | Jacobi | G06Q 30/02 705/14.53 |
| 2002/0095333 A1 * | 7/2002 | Jokinen | G06Q 30/02 705/14.26 |

(Continued)

FOREIGN PATENT DOCUMENTS

WO WO-2009017650 A1 2/2009

OTHER PUBLICATIONS

Bloom filter, Wikpedia description, (Accessed Jun. 11, 2007),8 pgs.

(Continued)

*Primary Examiner* — William A Brandenburg
(74) *Attorney, Agent, or Firm* — Maschoff Brennan

(57) ABSTRACT

Embodiments of methods and systems for dynamic messaging are disclosed. A lookup request may be received for a customer. A plurality of eligible campaigns may be determined for the customer. An eligible campaign of the plurality of eligible campaigns may include an available offer for the customer. The available offer may be represented by a compressed filter. The customer may match the compressed filter of the available offer of the plurality of eligible campaigns. The available offer of a campaign may be selected from the plurality of eligible campaigns based on metadata of the plurality of eligible campaigns and campaign history data of the customer. A message associated with the selected offer may be provided. The message may be capable of being presented to the customer.

29 Claims, 22 Drawing Sheets

(56) References Cited

U.S. PATENT DOCUMENTS

| | | | |
|---|---|---|---|
| 2003/0208402 A1* | 11/2003 | Bibelnieks | G06Q 30/02 705/14.43 |
| 2004/0054575 A1* | 3/2004 | Marshall | G06Q 30/0236 705/14.36 |
| 2004/0243470 A1* | 12/2004 | Ozer | G06Q 30/02 705/14.61 |
| 2005/0187781 A1* | 8/2005 | Christensen | H04L 12/581 709/207 |
| 2005/0267812 A1* | 12/2005 | Jensen | G06Q 30/02 705/27.1 |
| 2006/0253318 A1* | 11/2006 | Ramsey | G06Q 30/02 705/14.46 |
| 2006/0253328 A1* | 11/2006 | Kohli | G06Q 30/02 705/14.53 |
| 2006/0253467 A1* | 11/2006 | Ramsey | G06Q 10/063 |
| 2007/0033103 A1* | 2/2007 | Collins | G06F 17/2785 705/14.41 |
| 2008/0091535 A1* | 4/2008 | Heiser, II | G06F 17/30867 705/14.45 |
| 2008/0109300 A1* | 5/2008 | Bason | G06Q 30/0277 705/14.73 |
| 2008/0126146 A1* | 5/2008 | Benveniste | G06Q 30/02 705/14.68 |
| 2008/0249876 A1* | 10/2008 | Rice | G06Q 30/0212 705/14.14 |

OTHER PUBLICATIONS

Campaign Management—Unica Corporation, http://www.unica.com/product/product.cfm?pw=campain, (Accessed Jun. 11, 2007),2 pgs.

Event-based Marketing, Unica Corporation, http://www.unica.com/product/product.cfm?pw=detect, (Accessed Jun. 11, 2007),2 pgs.

Internet Marketing—Interactive Marketing Products, http://www.xymedia.com/products.aspx, (Accessed Jun. 11, 2007),3 pgs.

Live Lead Network.com, http://liveleadnetwork.com/hot_transfer_mortgage_lead.htm, (Accessed Jun. 11, 2007),2 pgs.

Metwally, Ahmed, et al., Duplicate Detection in Click Streams, *In Proceedings of the 14th WWW International World Wide Web Conference*. http://citeseer.ist.psu.edu/metwally05duplicate.html, (2005),1-12.

"International Application Serial No. PCT/US2008/008976, Search Report mailed Oct. 9, 2008", P220.

* cited by examiner

My Accounts

This is a list of your customers and the campaigns they are eligible to receive. [!] indicates the highest priority campaigns.

View by Campaign | View by Account

| Name ▽ | Contact | Campaigns | Last Contacted ▽ |
|---|---|---|---|
| Account 1 | 415-555-1212 | Compliance: Campaign 1<br>Sales: Campaign 2 [!]<br>Retention: Campaign 3 | June 4, 2007 |
| Account 2 | 212-555-1212 | Compliance: Campaign 1<br>Sales: Campaign 2<br>Retention: Campaign 3 [!] | June 2, 2007 |
| Account 3 | 310-555-1212 | No Campaigns | June 1, 2007 |
| Account 4 | 818-555-1212 | Compliance: Campaign 1<br>Sales: Campaign 2<br>Retention: Campaign 3 | June 2, 2007 |
| Account 5 | 510-555-1212 | Compliance: Campaign 1 [!]<br>Sales: Campaign 2<br>Retention: Campaign 3 | June 2, 2007 |
| Account 6 | 450-555-1212 | No Campaigns | June 1, 2007 |
| Account 7 | 312-555-1212 | Compliance: Campaign 2<br>Sales: Campaign 2 [!]<br>Retention: Campaign 1 | June 4, 2007 |
| Account 8 | 314-555-1212 | Compliance: Campaign 3<br>Sales: Campaign 1<br>Retention: Campaign 3 [!] | June 2, 2007 |
| Account 9 | 636-555-1212 | No Campaigns | June 1, 2007 |

FIGURE 15

Accounts Eligible for <campaign name>

*PayPal*

This is a list of customers eligible to receive the <campaign name> campaign.

☐ View Script

| Name ▽ | Contact | Last Contacted |
|---|---|---|
| Account 1 | 416-555-1212 | June 4, 2007 |
| Account 2 | 212-555-1212 | June 2, 2007 |
| Account 3 | 310-555-1212 | June 1, 2007 |
| Account 4 | 818-555-1212 | June 2, 2007 |
| Account 5 | 510-555-1212 | June 2, 2007 |
| Account 6 | 450-555-1212 | June 1, 2007 |
| Account 7 | 312-555-1212 | June 4, 2007 |
| Account 8 | 314-555-1212 | June 2, 2007 |
| Account 9 | 636-555-1212 | June 1, 2007 |

FIGURE 16

METHOD AND SYSTEM FOR DYNAMIC MESSAGING

BACKGROUND

An organization may wish to run one or more campaigns for its existing customers and potential customers to provide them with an offer that includes educational information, an encouragement to take advantage of an opportunity, and the like. The customers may be selected by the organization for the campaign based on a criterion. The organization may use a campaign manager to produce a list of users that meet a criterion.

To determine whether a customer is in a campaign, a brute force lookup is performed against a database that contains information regarding all users in the campaign. The brute force lookup may require extensive computing resources to perform the lookup when a real-time result is expected. For example, providing a real-time result would be desired to provide an offer to a customer visiting a web page where the offer is provided within the content of the web page.

BRIEF DESCRIPTION OF THE DRAWINGS

Some embodiments are illustrated by way of example and not limitation in the figures of the accompanying drawings in which:

FIGS. 12-16 are example user interfaces of the customer service provider of FIG. 1 according to an example embodiment;

DETAILED DESCRIPTION

Example methods and systems for dynamic messaging are described. In the following description, for purposes of explanation, numerous specific details are set forth in order to provide a thorough understanding of example embodiments. It will be evident, however, to one skilled in the art that the present invention may be practiced without these specific detail In an example embodiment, a lookup request may be received for a customer. A plurality of eligible campaigns may be determined for the customer. An eligible campaign of the plurality of eligible campaigns may include an available offer for the customer. The available offer may be represented by a compressed filter. The customer may match the compressed filter of the available offer of the plurality of eligible campaigns. The available offer of a campaign may be selected from the plurality of eligible campaigns based on metadata of the plurality of eligible campaigns and campaign history data of the customer. A message associated with the selected offer may be provided. The message may be capable of being presented to the customer.

In an example embodiment, a list of customers for an offer may be accessed. The list of customers may be hashed to create a compressed filter representing the list of customers associated with the offer. The compressed filter may be capable of being used to determine whether a particular customer is in the list of customers.

In an example embodiment, a lookup request for a customer may be received. A plurality of eligible campaigns may be determined for the customer. An eligible campaign of the plurality of eligible campaigns may include an available offer for the customer. The available offer may be represented by a compressed filter. The customer may match the compressed filter of the available offer of the plurality of eligible campaigns. The available offer of the plurality of eligible campaigns may be provided to an agent of the customer.

Figure 1:
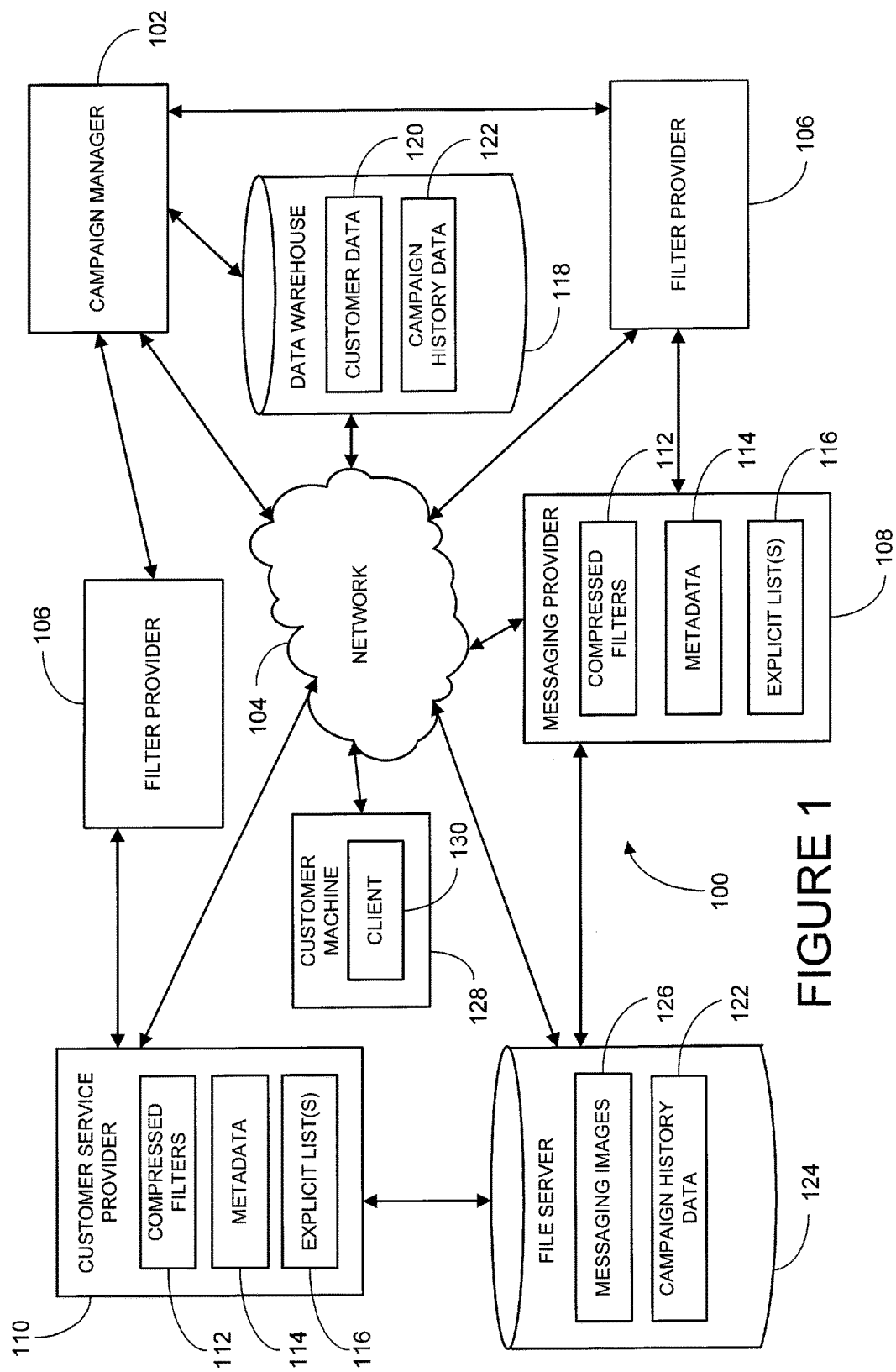
FIG. 1 is a block diagram of a system, according to an example embodiment.

FIG. 1 illustrates an example system 100 in which a campaign manager 102 may communicate with a messaging provider 108 and/or a customer service provider 110 through a filter provider 106 to provide an offer of a campaign to a customer.

The campaign manager 102 may generate campaigns and offers of campaigns to be provided to customers of an organization. The campaign may be a grouping of one or more offers that accomplishes marketing or other goals and may be generally geared toward a particular product, program, or theme. In an example embodiment, the campaign manager 102 may be AFFINIUM CAMPAIGN by Unica Corporation, MA4 by SAS Institute, Inc., or Customer Management (CM) Solutions by Teradata by NCR Corporation. Other campaign managers 102 may also be used.

The campaign manager 102 may be used to create a list of customers for a campaign. The customers may include users with and/or without a prior relationship to the organization. The campaign manager may use customer data 120 in a data warehouse 118 and optionally criterion to select customers for the list. The criterion may include, by way of an example, how long a customer has been a member of an organization, the products previously purchased by the customer, and the like. A customer may be in one campaign or a number of campaigns generated by the campaign manager 102.

One or more offers associated with a campaign may be targeted to an audience of customers. There may be multiple offers associated with a campaign, and multiple messaging images 126 associated with an offer. The messaging images 126 may be content and/or a message and may include text, images, a document, an executable file, and the like that is provided within or as an offer to the customer.

The filter provider 106 may format information received from the campaign manager 102 including an offer, a list of customers to receive the offer, and metadata 114. The list of customers may be used by the filter provider 106 to generate a compressed filter representing the list of customers provided by the campaign manager 102. In an example embodiment, the compressed filter may be created by applying a hash function, using a hash table, or otherwise encrypting the list of users.

The compressed filter, the list of users, and/or the metadata 114 may be provided from the campaign manager 102 to the messaging provider 108 and/or the customer service provider 110. The compressed filter may be updated daily or at a different frequency (e.g., multiple times per day or less frequently) by the filter provider 106 and provided to the messaging provider 108 and/or the customer service provider 110.

The messaging provider 108 may provide messages containing offers to customers in one or more channels. The message may be a non-targeted message available to all customers of the organization and/or a targeted message available to a subset of all customers of the organization. The channel may include, by way of example, direct mail, e-mail, web site, placement on a web site, in an application, or the like. The channel may be controlled by an organization associated with the messaging provider 108 and/or a different organization. The customer service provider 110 may provide offers to an agent that may then be made available to a customer. For example, the customer service provider 110 may present available campaigns to an agent for a customer that is speaking to the agent. An example embodiment of the messaging provider 108 and the customer service provider 110 are described in greater detail below.

The messaging provider 108 and/or the customer service provider 110 may be used to provide an offer of a campaign to a customer of an organization operating the messaging provider 108 and/or the customer service provider 110 or another organization. For example, the organization may provide offers to its customers on behalf of the other organization, or may provide offers to customers of the other organization on behalf of the other organization.

The messaging provider 108 and the customer service provider 110 may retain a number of compressed filters 112, the metadata 114, and/or one or more explicit lists 116. The compressed filters 112 may represent a list of customers that may be in a campaign or a segment of a campaign and may be received from the filter provider 106. The compressed filters 112 may be capable of being used to determine whether a particular customer is in the list of customers. The compressed filters 112 may be retained and run in memory by the messaging provider 108 and/or the customer service provider 110. The use of the compressed filters 112 may enable real-time look-up of a number of campaigns for a customer (e.g., for eligibility testing) at a substantially reduced hardware and operational cost. In an example embodiment, the use of a compressed filter may enable an offer to be provided (e.g., to a customer or an agent on behalf of a customer) in real-time at a substantially reduced hardware and operational cost.

The compressed filters 112 may be Bloom filters, however other types of compressed filters may also be used. The compressed filter 112 may be created by hashing a number of customer identifiers into a data structure. The resulting data structure may be used to determine through a look up of whether a particular customer identifier of a customer meets the resulting data structure.

The compressed filter 112 may be used to reduce the size of a data structure retaining the list of customer identifiers by 60-70%, however a greater or lesser percentage of reduction may also be achieved. The reduction in size may enable the compressed filter 112 to represent millions of customer identifiers in memory without incurring a significant hardware cost.

In an example embodiment, the Bloom filter is a space-efficient probabilistic data structure that may be used to test whether an element is a member of a set. False positives may occur when testing a customer identifier against the Bloom filter at a flexible error rate based on an amount of compression. A higher amount of compression may be used for a campaign in which a higher error rate is acceptable, while a lesser amount of compression may be used for a campaign in which a low error rate is sought.

The explicit list 116 may include the list of customer identifiers of the customers in a campaign. The explicit list may be used to confirm that a customer is in a campaign after a lookup is performed with the compressed filter 112. The explicit list 116 may include a list of all customer identifiers in a campaign and may be uncompressed. The explicit list 116 may be used with the compressed filter 112 to reduce or eliminate the error rate associated with the compressed filter.

The metadata 114 may define how a campaign functions. The metadata 114 may be republished to tune a running campaign. For example, a campaign may be retuned by altering fields of the metadata 114 that define an impression limit or click limit. In an example embodiment, one or more fields of the campaign may be altered during the running of campaign and other fields of the campaign may be prohibited from being altered during the running of the campaign.

The metadata 114 of a campaign may include, by way of an example, a campaign priority, a placement priority, a maximum number of campaign impressions per day, a maximum number of campaign impressions per week, a maximum number of campaign impressions per life of the campaign, a maximum number of campaign clicks per day, a maximum number of campaign clicks per week, a maximum number of campaign clicks per life of the campaign, a maximum number of offer impressions per day, a maximum number of offer impressions per week, a maximum number of offer impressions per life of the offer, a maximum number of offer clicks per day, a maximum offer clicks per week, a maximum number of offer clicks per life of the offer, or the like.

The metadata 114 may be defined on a campaign and/or an offer level and may be based on actions taken by the customer or in aggregate. For example, the maximum number of clicks per day may be based in aggregate for all customers of the campaign while the maximum number of impressions may be based on the customer's actions. An example of the metadata 114 is described in greater detail below.

The metadata 114 may be provided from the campaign manager 102 to the messaging provider 108 and/or the customer service provider 110 through the filter provider 106 in extra fields of a campaign definition.

The communication between the campaign manager 102, the filter provider 106, the messaging provider 108, and/or the customer service provider 110 may occur over a network 104. The network 104 may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

In an example embodiment, the campaign manager 102, the filter provider 106, the messaging provider 108 and the customer service provider 110 may operate on a single computer system or be distributed over multiple computer systems.

The messaging provider 108 and/or the customer service provider 110 may be used to provider a greater variety of messages (e.g., advertisements) to customers and/or enable more directed messages (e.g., information) to be provided to customers. The messaging provider 108 and/or the customer service provider 110 may select eligible campaigns for a customer among a number of campaigns based on the compressed filter and select an offer of an eligible campaign based on the metadata 114 of the eligible campaigns and campaign history data 122 of the customer.

The data warehouse 118 (e.g., an Enterprise Data Warehouse by NCR Corporation) may be database or other storage device that may be accessible to the campaign manager 102 locally or over the network 104. The data warehouse 118 may be updated on a daily batch or otherwise updated. The data warehouse 118 may contain the customer data 120 used by the campaign manager 102 to create a campaign. The customer data 120 may include data pertaining to a customer including, by way of an example, transactional information (e.g., items purchased and/or amount paid), another web site with which the customer is associated, and/or product adoption (e.g., ownership) information for the customer. The campaigns may be stored in the data warehouse 118. The customer data 120 may be collected in the system 100 or another system.

The campaign history data 122 may include data regarding messages that have been provided to the customers, offers that have been provided to customers, offers that have been accepted by customers, offers that have been rejected by customers, and/or historical impression tracking data. The campaign history data 122 may be used to determine whether a customer receives an offer or a subsequent offer. For example, a customer that selects an offer of a message in a first channel may not receive the same offer in a second channel, or a customer that rejects an offer made by an agent may not receive the same offer in a different channel. The data tracked in the campaign history data 122 may relate to one or more fields of the metadata 114 of one or more campaigns.

The campaign history data 122 and the messaging images may be stored on a file server 124. The campaign history data 122 on the live server may be provided to the data warehouse 118 in real-time, near real-time, on a daily basis, or at a greater or lesser frequency. The campaign history data 122 on the file server 124 may be used to determine a campaign in which a user should receive an offer, while the campaign history data 122 in the data warehouse 118 may be used for list generation. In an example embodiment, the data warehouse 118 may be combined with the file server 124.

As described in greater detail below, the offer may be made available to a customer by providing the message to a client 130 operating on a customer machine 128 and/or an offer may be made available to the customer through an agent.

A unified approach may be taken to providing messages for a campaign. For example, a message containing an offer may be sent via an e-mail to a customer on a first week, the message containing the offer may be provided to the customer on a web site during a second week, and the offer may be available to a agent during a third week. The unified approach may enable a cross-channel marketing campaign to increase customer responsiveness. Other types of unified and non-unified approaches for a campaign may also be used.

Figure 2:
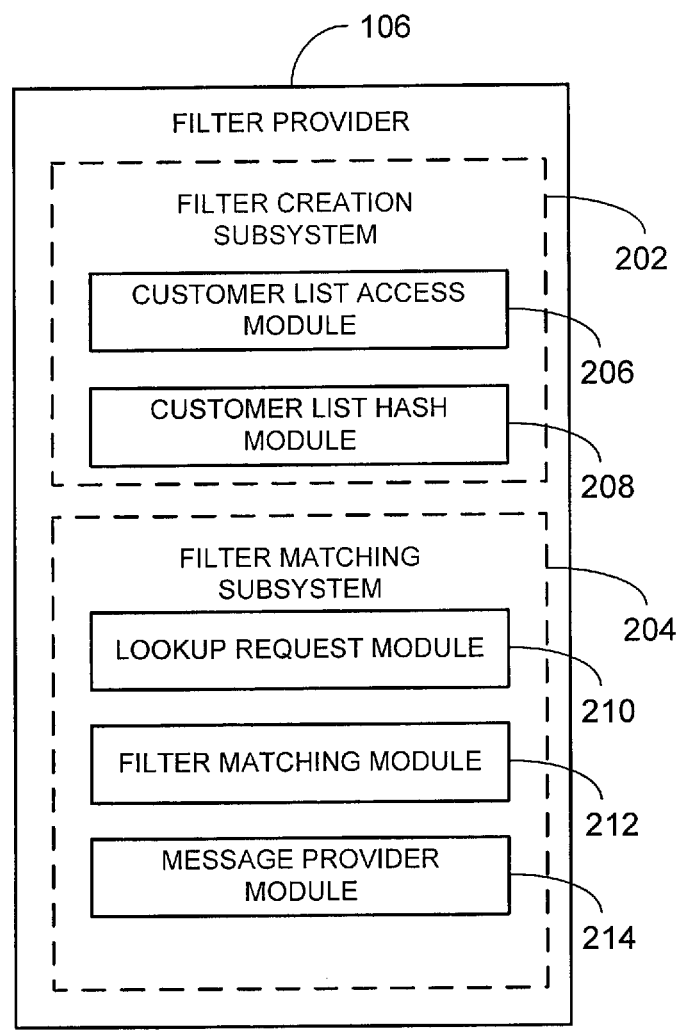
FIG. 2 is a block diagram of an example filter provider that may be deployed within the system of FIG. 1 according to an example embodiment.

FIG. 2 is an example of a filter provider 106 that may be deployed in the system 100 (see FIG. 1) or another system according to an example embodiment. The filter provider 106 may include a compressed filter creation subsystem 202, a compressed filter matching subsystem 204, and/or another subsystem.

The compressed filter creation subsystem 202 may include a customer list access module 206 and/or a customer list hash module 208. Other modules may also be used.

The customer list access module 206 accesses a list of customers for an offer from the campaign manager 102 (see FIG. 1). The list may be an original list of customers for the offer or an updated list of customers for the offer.

The customer list hash module 208 hashes the list of customers to create a compressed filter representing the list of customers associated with the offer. The hashing may be performed by applying a hashing function, using a hashing table, and the like. The compressed filter may be capable of being used to determine whether a particular customer is in the list of customers.

The compressed filter matching subsystem 204 may include a lookup request module 210, a compressed filter matching module 212, and/or a message provider module 214. Other modules may also be used.

The lookup request module 210 receives a lookup request for a customer to determine whether the customer is affiliated. The compressed filter matching module 212 determines whether the customer matches the compressed filter (e.g., and is thereby potentially within the list of customers from which the compressed filter was created). The customer may match the compressed filter even though the customer was not in the list of customers from which the compressed filter was made due to an amount of error due from compression. For example, when the compressed filter 112 is a Bloom compressed filter, the error rate may be tunable between 0.1 percent and 0.0001 percent based on an amount of compression used. However, the Bloom compressed filter and/or other types of compressed filters may have higher or lower error rates. The error rate of other types of compressed filters may or may not be tunable based on compression and/or other factors. In an example embodiment, the explicit list 116 may be used with the compressed filter 112 to eliminate error associated with the compressed filter (e.g., reporting that a customer is associated with a campaign when the user is not).

The message provider module 214 provides a message associated with an offer for the customer in response to the determination of whether the customer matches the compressed filter. The message may be capable of being presented to the customer. The selected offer may be provided for the customer in a channel (e.g., on a web site).

Figure 3:
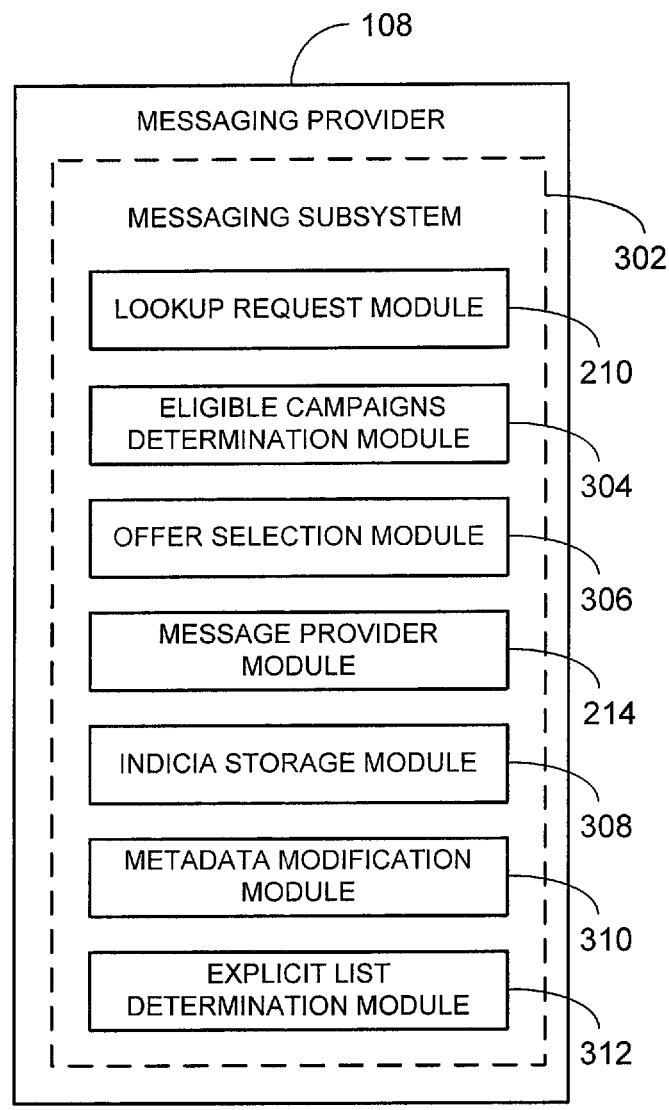
FIG. 3 is a block diagram of an example messaging provider that may be deployed within the system of FIG. 1 according to an example embodiment.

FIG. 3 is an example of a messaging provider 108 that may be deployed in the system 100 (see FIG. 1) or another system according to an example embodiment. The messaging provider 108 may include a messaging subsystem 302 and/or another subsystem.

The messaging subsystem 302 may include the lookup request module 210, an eligible campaigns determination module 304, an offer selection module 306, the message provider module 214, an indicia storage module 308, a metadata modification module 310, and/or an explicit list determination module 312. Other modules may also be used.

The eligible campaigns determination module 304 determines eligible campaigns for a customer. The eligible campaigns include an available offer for the customer. The available offer may be represented by a compressed filter. The customer may match the compressed filter of the available offer of the eligible campaigns.

The offer selection module 306 selects the available offer of a campaign from the eligible campaigns based on the metadata 114 of the eligible campaigns and campaign history data 122 of the customer.

The indicia storage module 308 stores indicia that a message was provided for the customer in the campaign history data 122 of the customer.

The metadata modification module 310 modifies one or more fields of the metadata 114 associated with a campaign. In an example embodiment, one or more fields of the metadata 114 may be allowed to be changed once a campaign is running and/or one or more fields of the metadata may be prohibited from being changed once a campaign is running.

The explicit list determination module 312 determines whether the customer meets an explicit list for the campaign of a selected offer.

Figure 4:
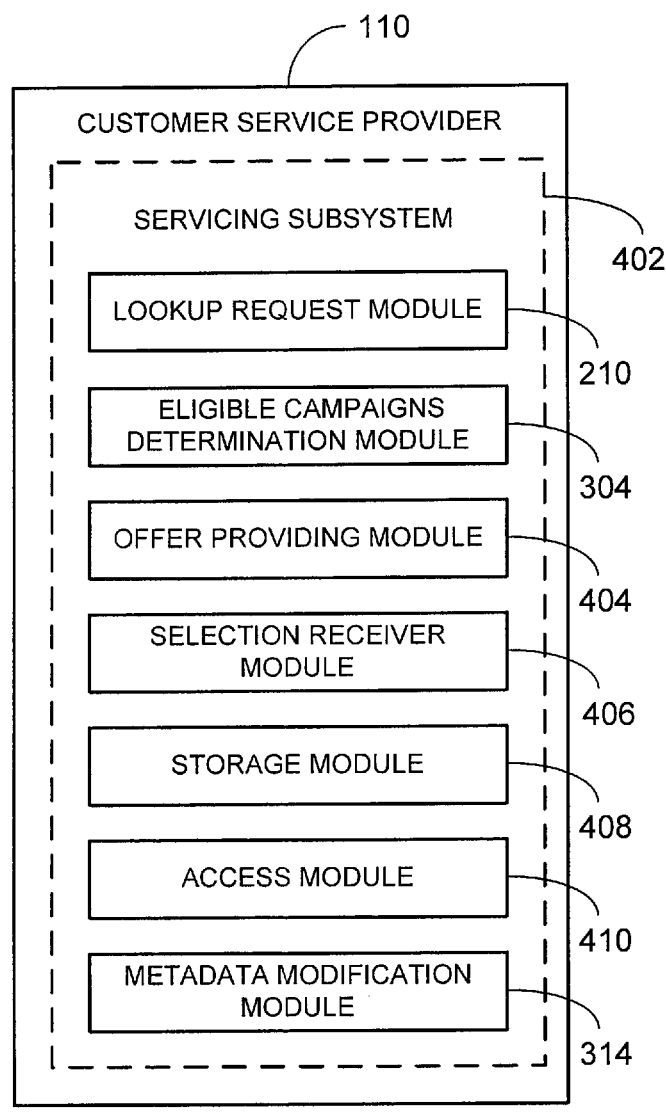
FIG. 4 is a block diagram of an example customer service provider that may be deployed within the system of FIG. 1 according to an example embodiment.

FIG. 4 is an example of a customer service provider 110 that may be deployed in the system 100 (see FIG. 1) or another system according to an example embodiment. The customer service provider 110 may include a servicing subsystem 402 and/or another subsystem.

The servicing subsystem 402 may include the lookup request module 210, the eligible campaigns determination module 304, an offering providing module 404, a selection receiver module 406, a storage module 408, an access module 410, and/or the metadata modification module 314. Other modules may also be used.

The offering providing module 404 provides the available offers of the eligible campaigns to an agent of the customer. The available offers may be provided to the agent in a format based on the metadata and the campaign history data 122 of the customer.

The selection receiver module 406 receives a selection of the available offer of a campaign from the eligible campaigns. The storage module 408 stores indicia regarding the selection of the available offer in the campaign history data 122 of the customer. The access module 410 accesses the metadata 114 of the eligible campaigns and the campaign history data 122 of the customer.

Figure 5:
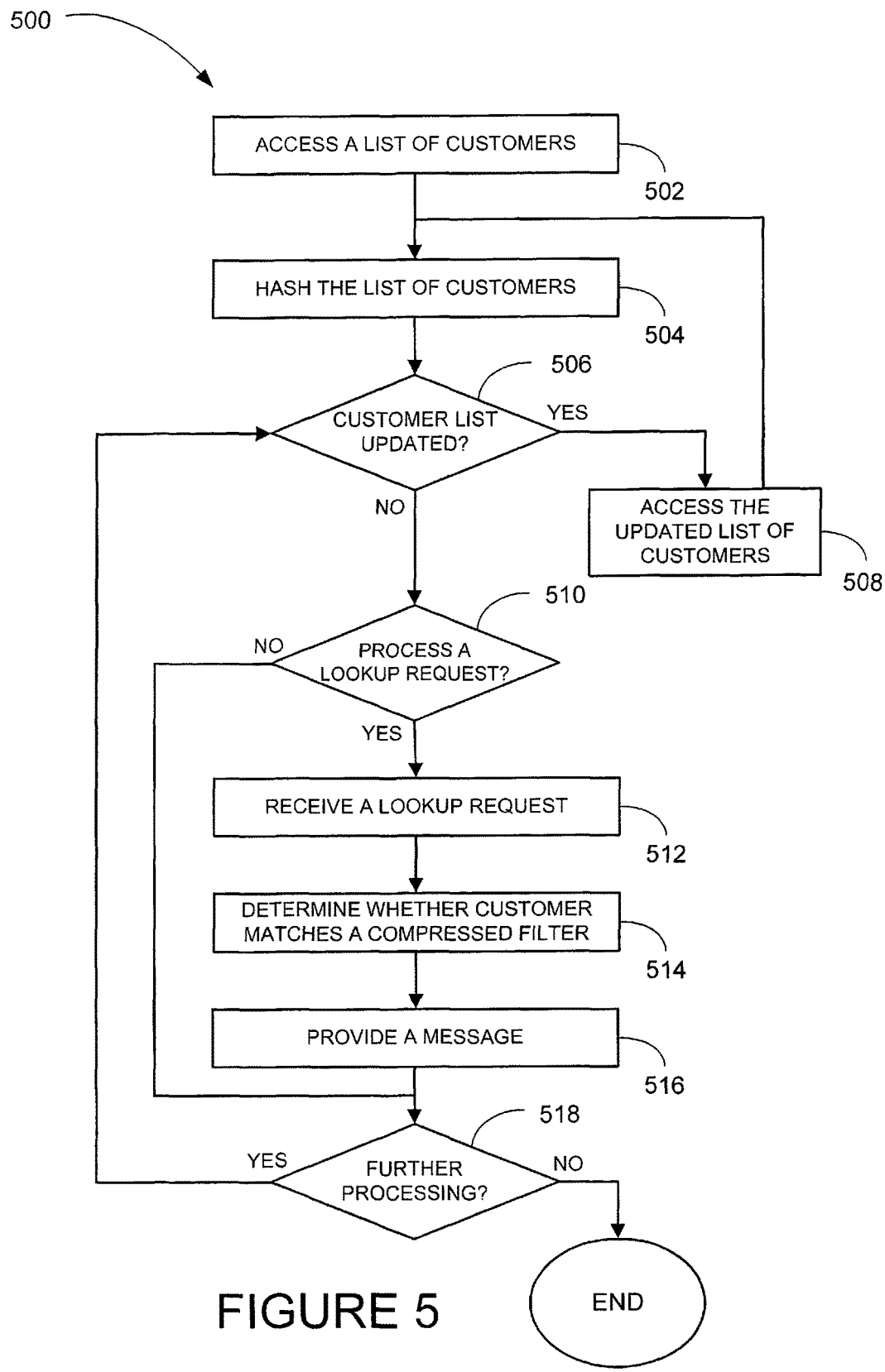
FIG. 5 is a flowchart illustrating a method for creating a compressed filter according to an example embodiment.

FIG. 5 illustrates a method 500 for creating a compressed filter according to an example embodiment. The method 500 may be performed by the filter provider 106, the messaging provider 108, a combination of the filter provider 106 and the messaging provider 108, or another provider. For example, the operations at blocks 502-508 may be performed by the filter provider 106 and the operations at blocks 510-516 may be performed by the messaging provider 108, however other implementations may also be used.

A list of customers for an offer is accessed at block 502. For example, the list of customers may be received from the campaign manager 102 (see FIG. 102) as being in a campaign or a segment of the campaign.

At block 504, the list of customers is hashed to create a compressed filter representing the list of customers associated with the offer. The hashing performed during the operations at block 504 may include using a hashing function, a hashing table, or utilizing a different of encryption to create the compressed filter that represents the list of customer identifiers in a campaign. Hashing the list of users to create a compressed filter may reduce the size of data to be retained. In an example embodiment, the compressed filter may enable the messaging provider 108 and/or the customer service provider 110 to operate cheaper and faster as opposed to retaining an uncompressed list of customer identifiers.

A determination may be made at decision block 506 whether the list of customers has been updated since creation of the compressed filter. For example, the list of customers may be updated based on modifications to a campaign and/or a segment of a campaign by the campaign manager 102. If a determination is made that the list of customers has been updated, an updated list of customers may be accessed for the offer at block 508 and the method 500 may return to block 504 to hash the updated list of customers to create an updated compressed filter representing the updated list of customers associated with the offer. The updated compressed filter may then be used in place of the compressed filter for the offer. If a determination is made at decision block 506 that the list of customers has been not updated, the method 500 may proceed to decision block 510.

At decision block 510, a determination may be made as to whether a lookup request for a customer may be processed. If a determination is made that a lookup request may be processed, a lookup request for a customer may be received at block 512.

In an example embodiment, the lookup request may be received in response to the customer visiting a web page of a web site. The customer may be a new customer visiting the web site for the first time, may already be logged in to a web site in which the web page is provided, may be recognized by geocoding while visiting the web page, may be recognized by IP address while visiting the web page, or the like.

A determination of whether the customer matches the compressed filter may be made at block 514. The customer may match the compressed filter when the user was in the list of customers from which the compressed filter was created or the compressed filter erroneously matches that the user was in the list of customers due to compression error from the hashing.

A message associated with the offer for the customer may be provided in response to the customer matching the compressed filter at block 516. For example, the message may be provided to the user in a web page and indicate to the customer that a limited time discount is available.

In an example embodiment, the list of customers may include a list of customer identifiers and the lookup request of the customer may include a customer identifier, the list of customers may include a list of customer e-mail addresses and the lookup request of the customer may include a customer e-mail address, and the like.

A determination may be made at decision block 518 whether to perform further processing. If a determination is made to perform further processing, the method 500 may return to decision block 506. If a determination is made not to perform further processing at decision block 518, the method 500 may terminate.

Figure 6:
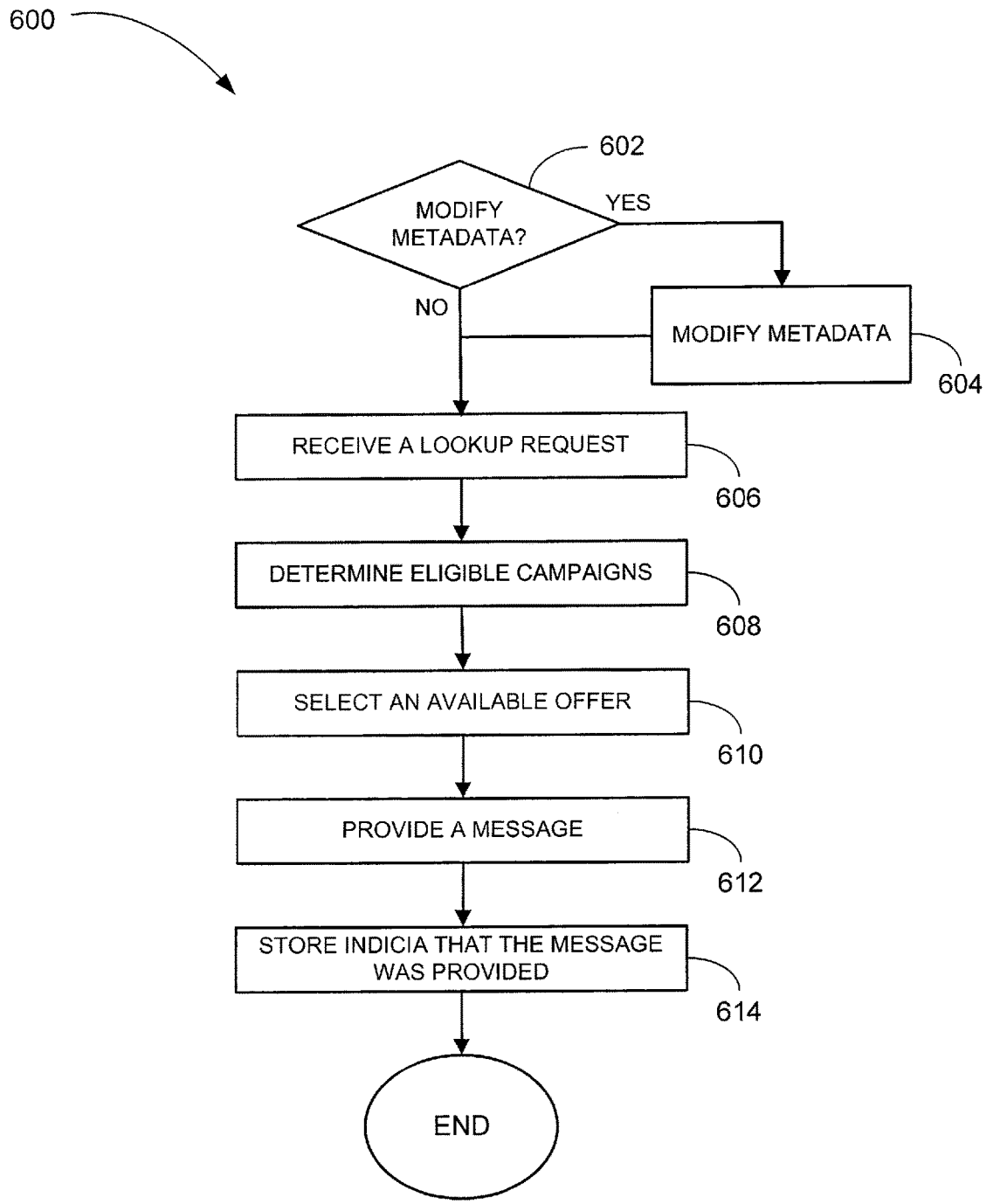
FIG. 6 is a flowchart illustrating a method for conducting campaign messaging according to an example embodiment.

FIG. 6 illustrates a method 600 for conducting campaign messaging according to an example embodiment. The method 600 may be performed by the messaging provider 108 (see FIG. 1) or another provider.

A determination may be made at decision block 626 whether to modify the metadata 114 associated with one or more campaigns. If a determination is made to modify the metadata 114, the metadata 114 associated with one or more campaigns may be modified at block 604. Modifying the metadata 114 may retool (e.g., republish) the campaign. If a determination is made not to modify the metadata 114 at decision block 602 or upon completion of the operations at block 604, the method 600 may proceed to block 606.

A lookup request may be received for a customer at block 606. In an example embodiment, the lookup request may be received directly from a web page or though an HTTP request that is separately loaded in a page.

Eligible campaigns are determined for the customer at block 608. Each of the eligible campaigns may include an available offer for the customer. The available offer may be represented by a compressed filter. The customer may match the compressed filter of the available offers of the eligible campaigns. The compressed filter may be retained in memory of a computing system during the operations at block 608.

At block 610, an available offer of a campaign is selected from the eligible campaigns based on the metadata 114 of the eligible campaigns and the campaign history data 122 of the customer.

The available offer may be a targeted or non-targeted offer. The targeted offer may be provided to a subset of the available customers (e.g., selected customers) of a provider while a non-targeted offer may be available to all customers of the provider. For example, the non-targeted offer may notify all customers of a new feature while a targeted offer may provide a discount to a selected or otherwise eligible customer.

A message associated with the selected offer is provided at block 612. The message may be capable of being presented to the customer. The message may be an educational message, a sales message, a compliance message, a retention message, or the like.

Indicia that the message was provided for the customer may be stored in the campaign history data 122 of the customer at block 614.

Figure 7:
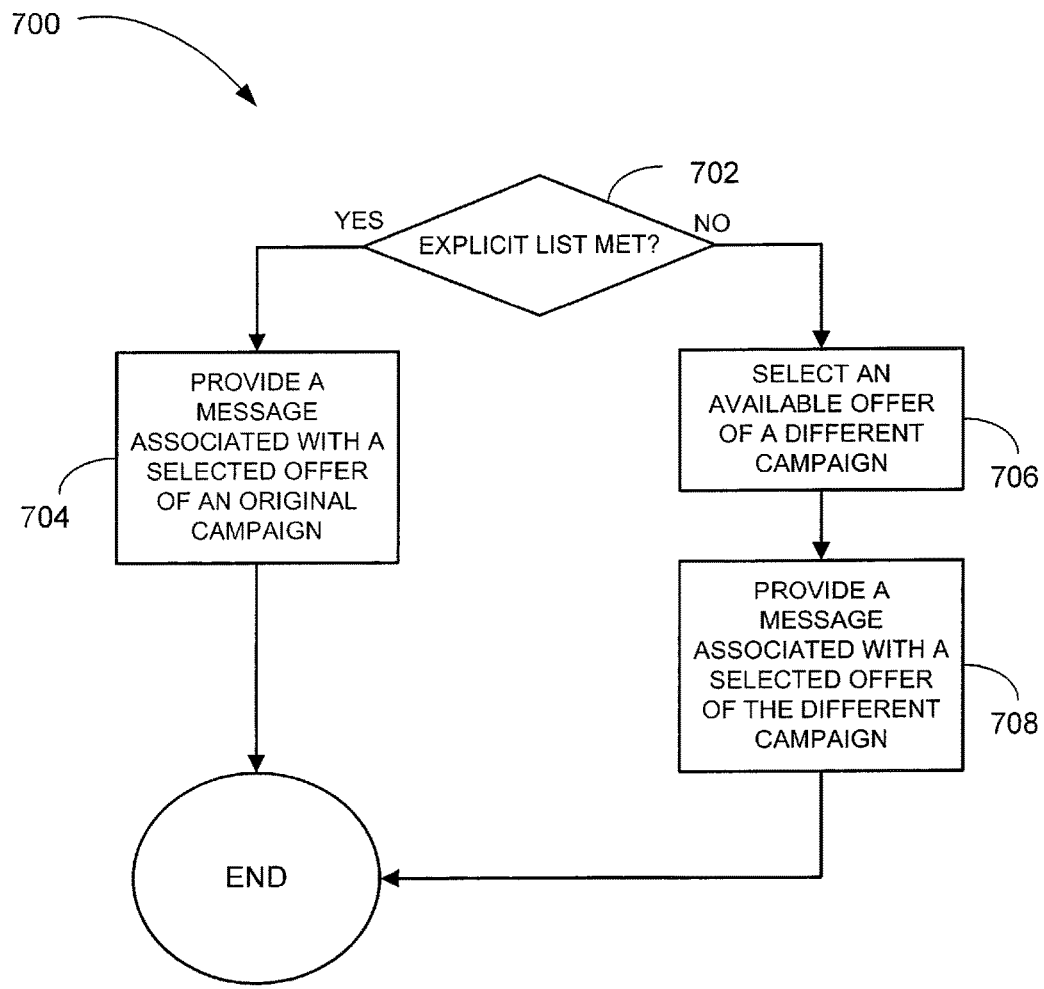
FIGS. 7 and 8 are flowcharts illustrating a method for providing a message according to an example embodiment.

FIG. 7 illustrates a method 700 for providing a message according to an example embodiment. The method 700 may be performed at block 612, by the messaging provider 108, or be otherwise performed.

A determination may be made at decision block 702 as to whether an explicit list has been met by the user (e.g., whether the user is on the explicit list). If a determination is made that the user has met the explicit list, a message associated with the selected offer may be provided for the channel at block 704. If a determination is made at decision block 702 that the explicit list has not been met, an available offer of a different campaign may be selected from the eligible campaigns based on the metadata 114 of the eligible campaigns and the campaign history data 122 of the customer at block 706. The message associated with the selected offer of the different campaign may be provided at block 708.

Figure 8:
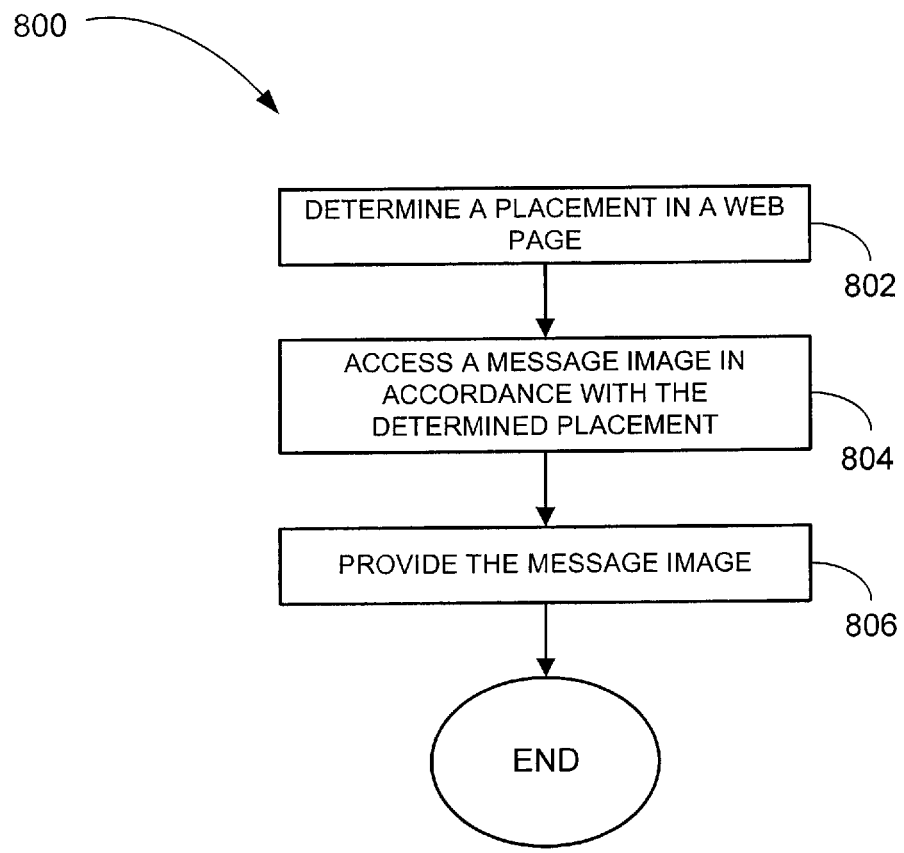

FIG. 8 illustrates a method 800 for providing a message according to an example embodiment. The method 800 may be performed at block 612, by the messaging provider 108, or be otherwise performed.

A placement in a web page is determined at block 802.

A messaging image in accordance with the determined placement is accessed from the messaging images 126 in the data warehouse 118 at block 804.

At block 806, the messaging image associated with the selected offer is provided. The messaging image may be capable of being presented to the customer at the determined placement in the web page.

In an example embodiment, if the messaging image may not be retrieved in an allotted period of time, a default image may be provided instead of the messaging image.

Figure 9:
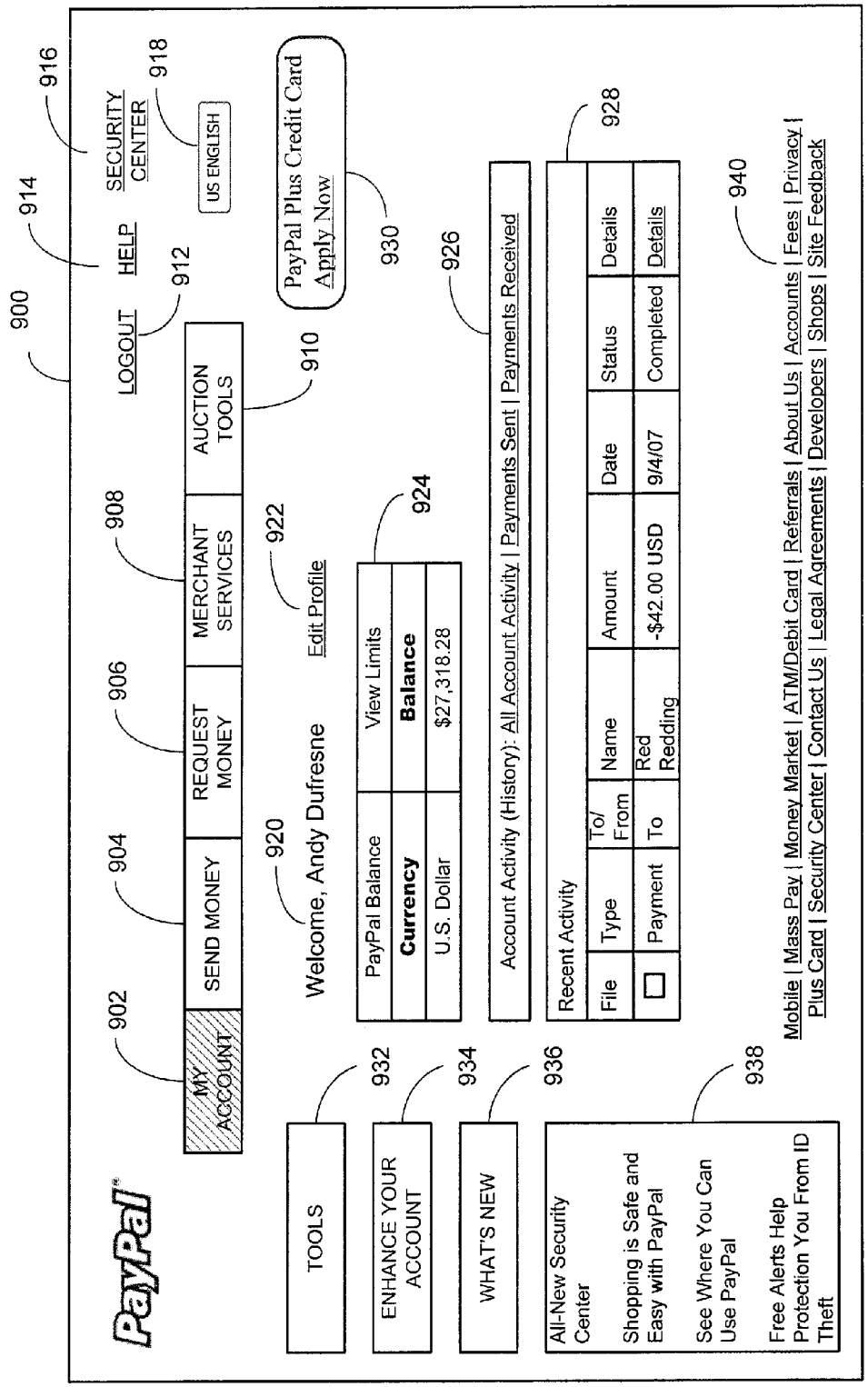
FIGS. 9 and 10 are example user interfaces of the client of FIG. 1 according to an example embodiment.

FIG. 9 illustrates an example user interface 900 that may be presented to a customer interfacing with the system 100 (see FIG. 1) or another system. In an example embodiment, the user interface 900 may be provided to the customer when the customer is logged into the system 100 to provide the customer with targeted and/or non-targeted messages.

The user interface 900 may include a series of tabs 902-910 including an account tab 902, a send money tab 904, a request money tab 906, a merchant services tab 908, and/or auction tools tab 910. As illustrated in FIG. 9, the account tab 1002 is selected and content that relates to the account of the customer is presented on the user interface 1000. However, other tabs may also be selected by default or by interaction with the customer.

The send money tab 904 may provide content to the customer relating to sending money from the customer. The request money tab 906 may provide content related to receiving money from a different customer. The merchant services tab 908 may provide content related to services that may be of interest to a customer that is a merchant. The auction tools tab 910 may provide content relating to the use of payment functionality in auction listings by the customer.

The customer may log out of the account by selecting a logout link 912, may seek help information by selecting a help link 914, or visit a security center page by selecting a security center link 916. The customer may be able to change a language in which the user interface 900 is presented to the customer by selecting a language button 918.

A welcome message 920 may be presented to the customer. The customer may edit an account profile by selecting an edit profile link 922. Financial information may be provided to the customer through a financial section 924. The customer may view account activity related information by default and/or selection of a link on the account activity section 926. Recent activity related to the financial section 924 may be presented to the user in a recent activity section 928.

Offers for campaigns may be provided to the customer with offers 930-938. The offers may be targeted offers and/or non-targeted offers. The customer may navigate to further pages by use of a navigation control 940.

Figure 10:
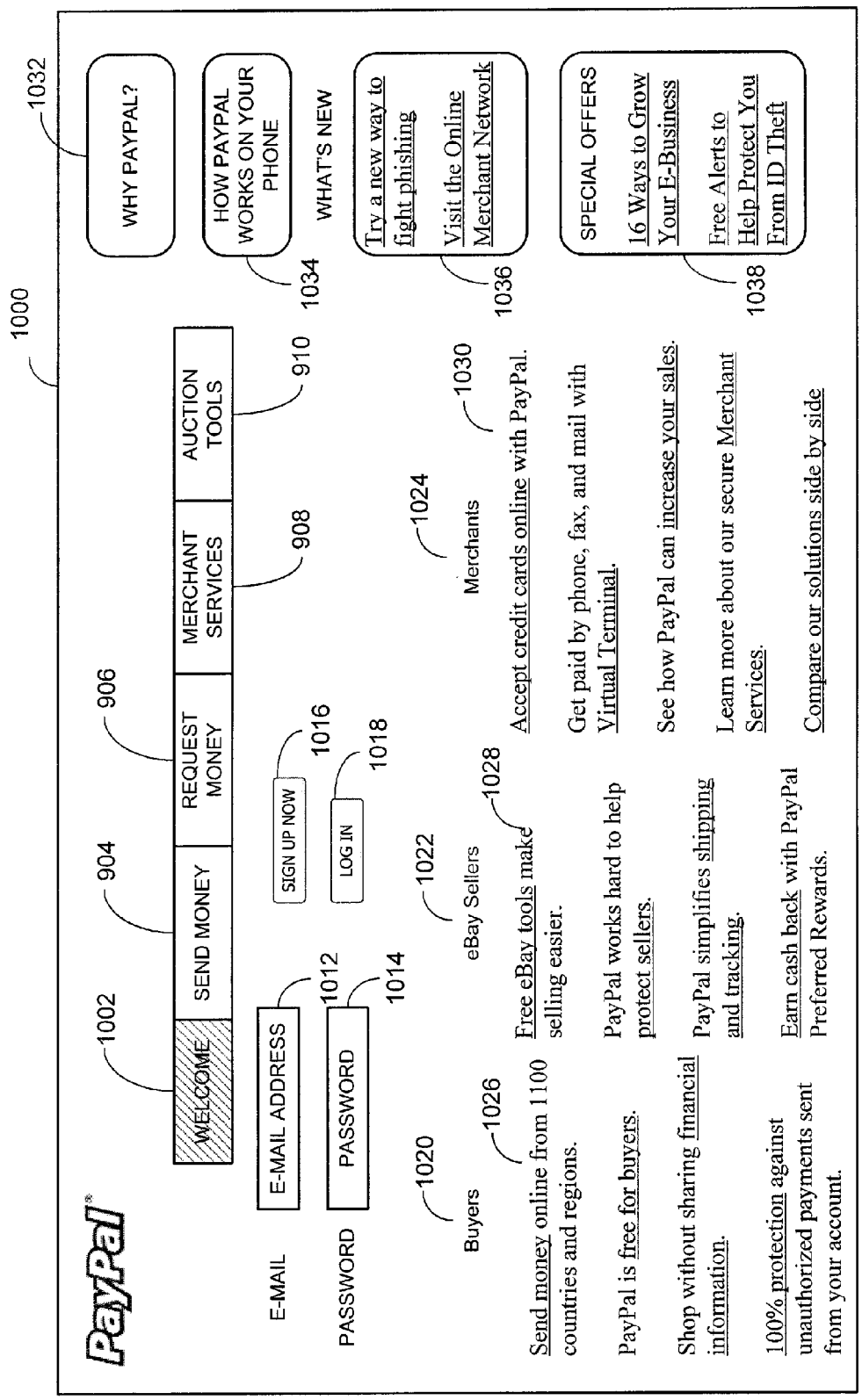

FIG. 10 illustrates an example user interface 1000 that may be presented to a customer interfacing with the system 100 (see FIG. 1) or another system. In an example embodiment, the user interface 1000 may be provided to the customer when the customer is not logged into the system 100 to provide the customer with targeted and/or non-targeted messages. For example, messages may be provided based on recognition that the customer is from a particular country.

The user interface 1000 may include a series of tabs 1002-1010 including a welcome tab 1002, a send money tab 904, a request money tab 906, a merchant services tab 908, and/or auction tools tab 910. As illustrated in FIG. 10, the welcome tab 1002 is selected and content that welcomes the customer to a web site is presented to the customer on the user interface 1000. However, other tabs may also be selected by default or by interaction with the customer.

The customer may sign in to the web site by entering an e-mail address in an identifier field 1012 and a password in a password field 1014. The customer may then select a log in button 1018 to log into the web site. If the customer does not have an account with the web site, the customer may select a sign up now button 1016 to sign up for an account with the web site.

The content of the user interface 1000 may include three categories 1020-1024 for content including a buyers category 1020, an EBAY sellers category 1022, and/or a merchant category 1024. Other categories may also be used.

Buyer related content 1026 may be available under the buyers category 1020, EBAY seller related content 1028 may be available under the EBAY sellers category 1022, and merchant related content 1030 may be available under the merchant category 1024.

The user interface 1000 may include a first message 1032 and a second message 1034 in the form of educational messages to inform the customer of features and/or functionality provided by the web site. The first message 1032 and the second message 1034 may be provided in accordance with the operations at block 612, block 708, or otherwise provided.

A first category of messages 1036 may include a number of associated messages for the customer and a second category of messages 1038 may also include a number of associated messages for the customer. The associated messages of the first category of messages 1036 and the second category of messages 1038 may be provided in accordance with the operations at block 612, block 708, or otherwise provided.

The user interface 1000 is merely an example of one type of interface that may be presented to a customer accessing the system 100 or another system. Other user interfaces for accessing the system 100 or another system may also be provided. For example, a different number of messages, categories of messages, or configuration of the user interface 1000 may be used.

Figure 11:
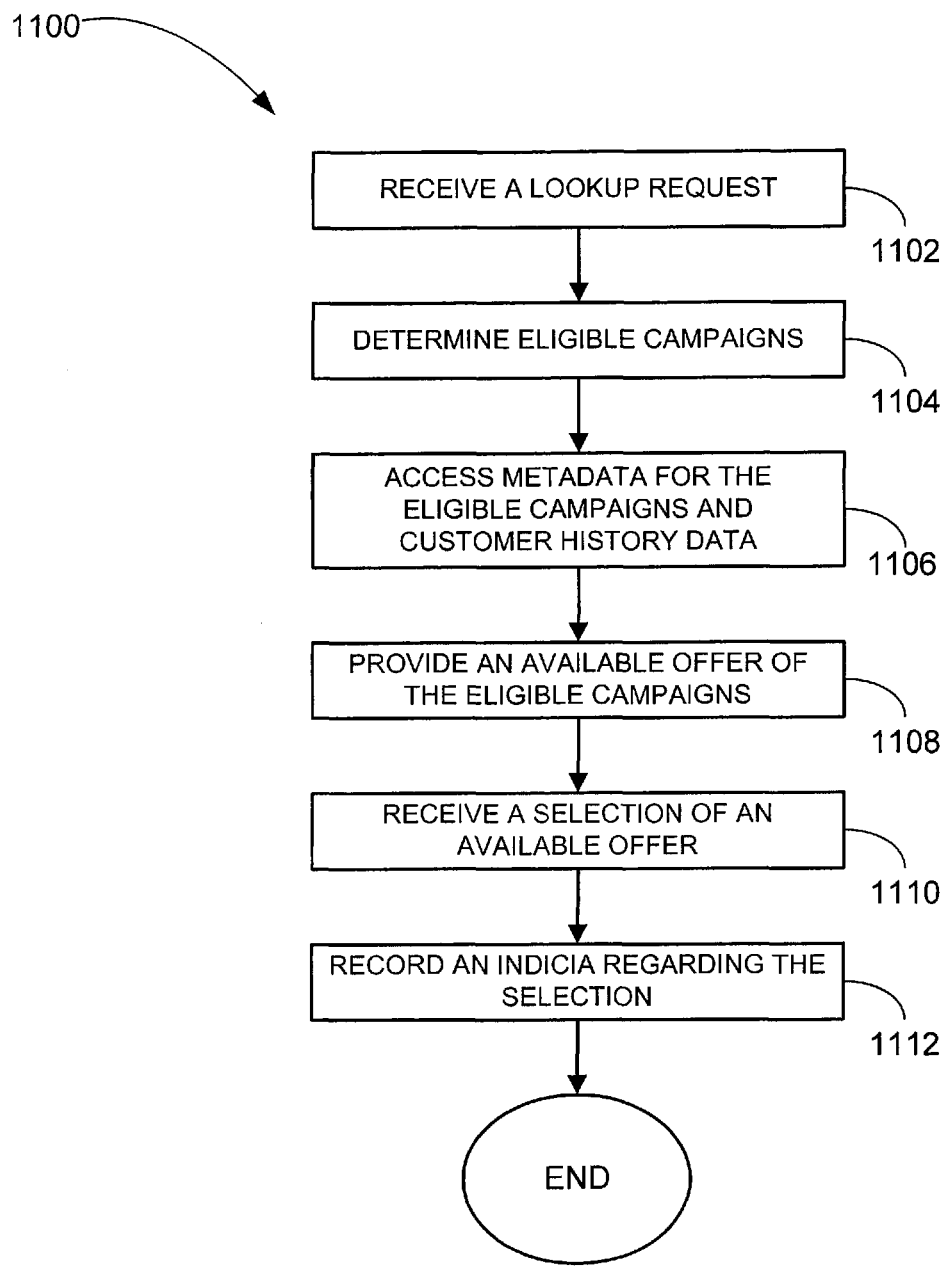
FIG. 11 is a flowchart illustrating a method for processing an offer selection according to an example embodiment.

FIG. 11 illustrates a method 1100 for processing an offer selection according to an example embodiment. The method 1100 may be performed by the customer service provider 110 (see FIG. 1) or another provider.

A lookup request is received for a customer at block 1102.

Eligible campaigns are determined for the customer at block 1104. The eligible campaigns may include an available offer for the customer. The available offer may be represented by a compressed filter. The customer may match the compressed filter of the available offer of the eligible campaigns.

The metadata 114 of the eligible campaigns and the campaign history data 122 of the customer may be accessed at block 1106.

The available offers of the eligible campaigns is provided (e.g., through a user interface) to an agent of the customer at block 1108. In an example embodiment, the available offer of the eligible campaigns may be provided to an agent of the customer in a format based on the metadata 114 and the campaign history data 122 of the customer.

In an example embodiment, the metadata 114 associated with at least one of the campaigns may be modified and the available offer of the campaign from the eligible campaigns may be provided to the agent based on the modified metadata 114 of the corresponding campaigns, the unmodified metadata 114 of the remaining campaigns and the campaign history data 122 of the customer.

A selection of the available offer of a campaign from the eligible campaigns may be received (e.g., from the agent) at block 1110.

Indicia regarding the selection may be stored in the campaign history data 122 of the customer at block 1112.

Figure 12:
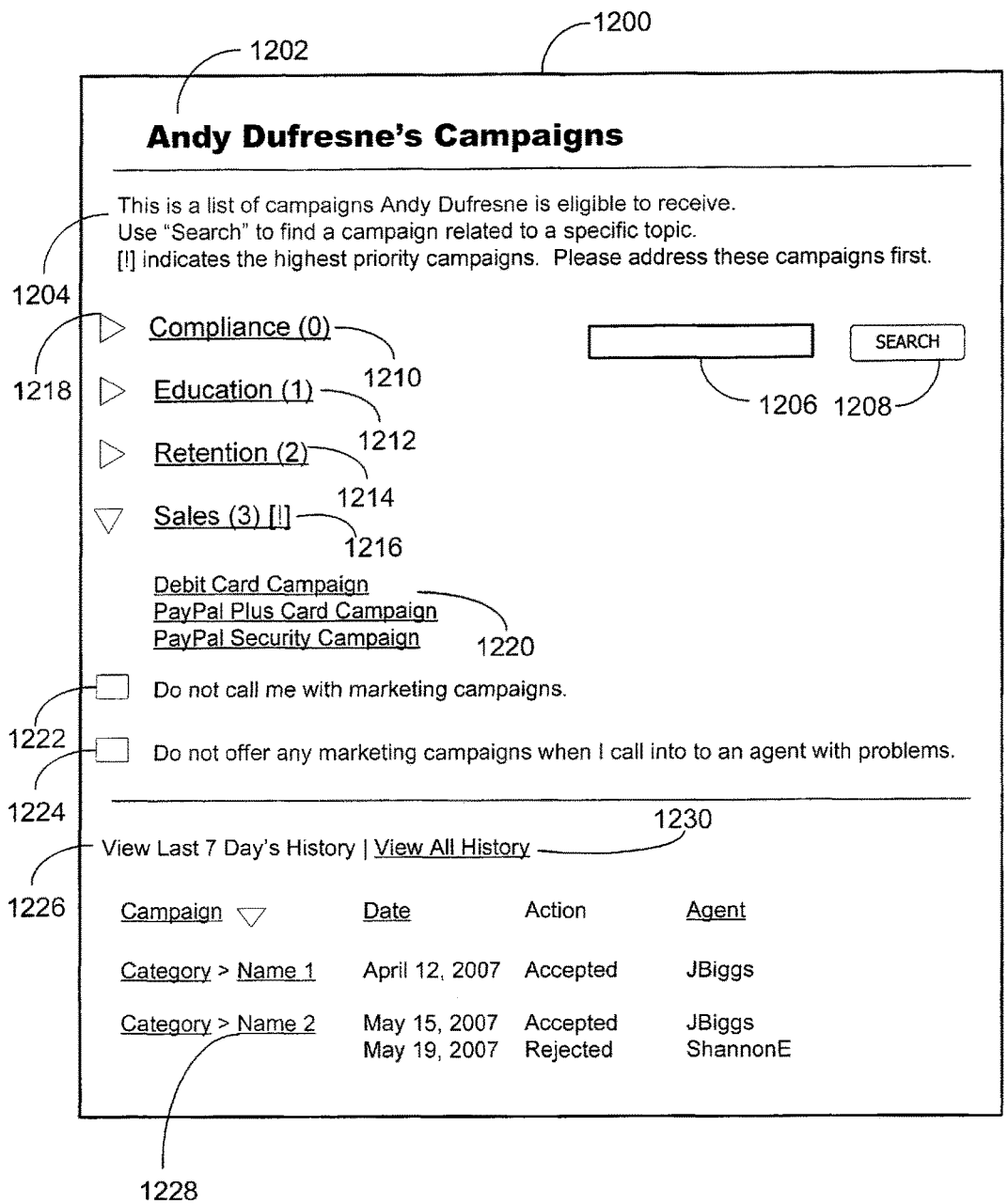

FIG. 12 illustrates an example user interface 1200 that may be provided to an agent to interface with the system 100 through the customer service provider 110 (see FIG. 1). The user interface 1200 may also be used in other systems.

The user interface 1200 may include an identifier 1202 to identify that the user interface 1200 relates to the campaigns available to a particular customer. The agent may also be provided with instructional text 1204 regarding the user interface 1200.

A search field 1206 and a search button 1208 may enable the agent to perform a keyword search for campaigns. For example, the agent may search on contextual terms received in a conversation with the customer. Upon performing a search, the metadata of a campaign that contains the keywords may be highlighted and, if the campaign is in a collapsed section, the collapsed section may be expanded.

The user interface 1200 lists for different categories of campaigns: a compliance category 1210, an education category 1212, a retention category 1214, and a sales category 1216. However, other categories may also be used. A number next to a category may indicate a number of campaigns under a particular category. An expand/collapse icon 1218 may be select to list all available campaigns under a category.

The compliance category 1210 may enable an agent to select among a number of compliance offers available for the customer. Compliance offers may be provided to obtain, for example, compliance with a legal regulation, a site policy (e.g., a privacy policy), or other reason (e.g., functionality may be unavailable for a period of time). The compliance offers may include, by way of an example, a notification that the customer needs to sign an agreement, a notification that the customer may not carry a negative balance in a payment account, a notification that the customer needs to complete a certain number of transactions during a period of time, and the like.

The education category 1212 may enable an agent to select among a number of education offers available for the customer to increase awareness, understanding, and/or appreciation. The education offers may include, by way of an example, a notification of a new feature on a web site, a notification of a feature not previously used by the customer on the web site, a notification of how to detect a spoofed web site, a notification of how to safely conduct transactions, and the like. The user may not need to take any action in response to an education offer.

The retention category 1214 may enable an agent to select among a number of retention offers available for the customer. The retention offers may seek to appease a customer and/or improve the relationship with the customer. For example, the retention options may include crediting an account of a good customer, terminating an account of a bad customer, providing a toll free telephone number or special access telephone number for enhanced customer support, and the like.

The sales category 1216 may enable an agent to select among a number of sales offers available for the customer. The sales offers may include an attempt to encourage the customer to adopt or use a new product or try a new feature. Sales offers may include, by way of an example, a product up-sell, a product cross-sell, or a product trial. Other sales offers may also be used.

As illustrated in FIG. 12, a campaign listing 1220 under the sales category 1216 is shown to include three available campaigns. However, different types and numbers of campaigns may be available under any of the categories 1210-1216.

In an example embodiment, the campaign categories 1210-1216 that may be available to the agent may be hierarchical to place greater importance on one or more campaign categories as compared to other campaign categories. For example, the compliance campaign category may be given a higher importance than the education campaign category and the retention campaign category. Other hierarchical configurations with the same campaigns or different campaign categories may also be used.

The customer may notify the agent to opt-in and/or opt-out of campaigns. For example, a box 1222 may be selected by the agent so that the user will not be contacted with marketing campaigns and/or a box 1224 may be selected the agent so that the customer will not be offered marketing campaigns when contacting an agent.

The agent may select a first history selection 1226 to see a recent campaign history of the customer or a second history selection 1228 to see available history on the customer.

Figure 13:
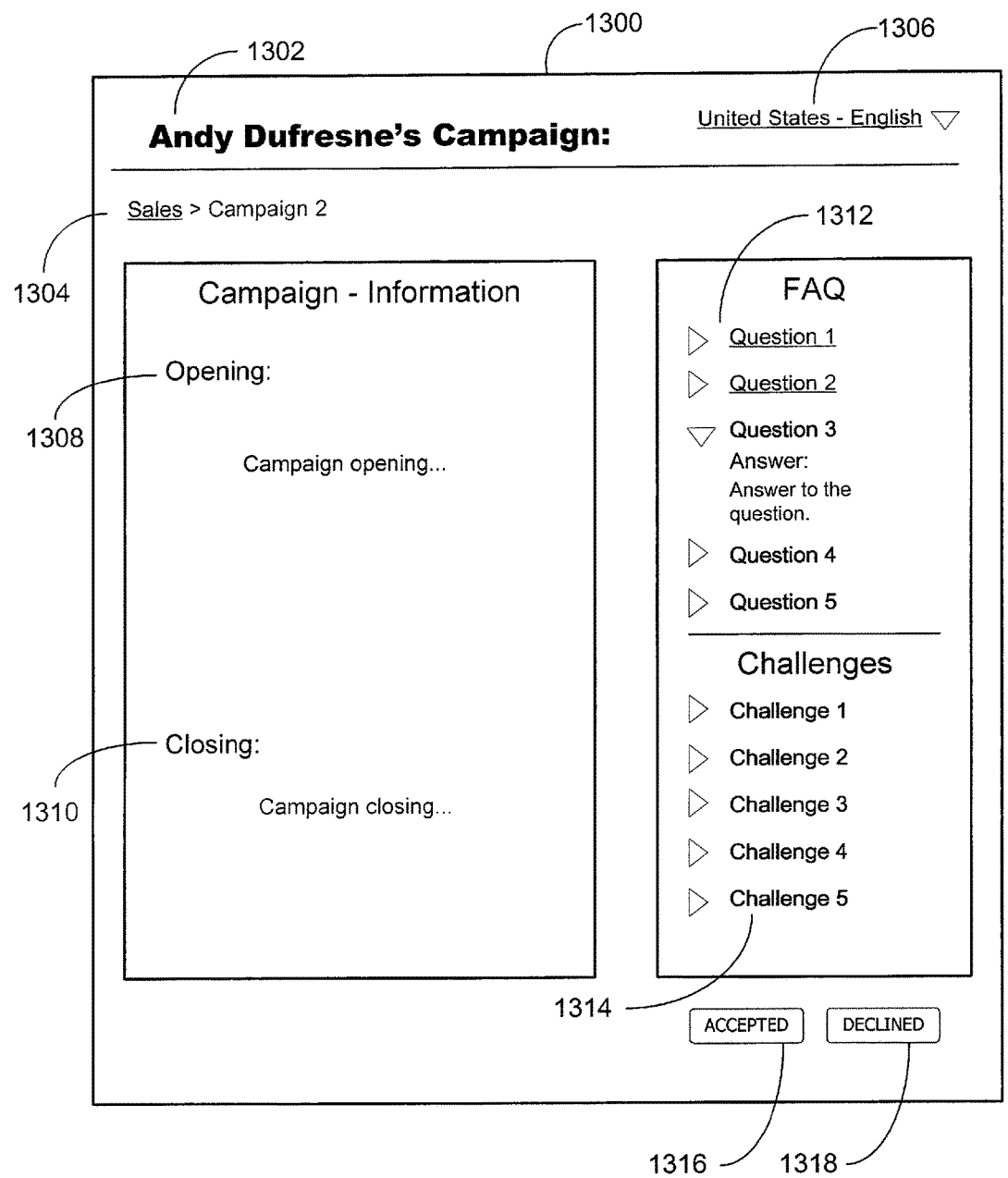

FIG. 13 illustrates an example user interface 1300 that may be provided to an agent to interface with the system 100 through the customer service provider 110 (see FIG. 1). The user interface 1300 may also be used in other systems. In an example embodiment, the user interface 1300 is an example user interface shown to the agent in response to selecting a campaign for a customer. However, different user interfaces may be shown to the agent in response to selecting the campaign.

The user interface 1300 may include an identifier 1302 to identify that the user interface 1300 relates to a particular campaign available to an identifier customer. The agent may also be provided with campaign identification 1304 identifying a category and a campaign within the category. A different language type 1306 may be selected by the agent to provide the content on the user interface 1300 in a different language.

A campaign script may be provided to the agent in the form of a suggested opening 1308 and a suggested closing 1310. The suggested opening 1308 may include an opening script and the suggested closing 1320 may include a closing script to be read or otherwise presented to the customer.

A FAQ section 1312 may include a series of questions that may be asked by a customer during the presentation of the campaign information. One or more of the series of questions may be expanded to provide the agent with an answer to an associated question.

A challenges section 1314 may include a series of challenge points that may be asked to a customer during the presentation of the campaign information. One or more of the series of challenges points may be expanded to provide the agent with acceptable responses to the challenges points.

The agent may record that a particular offer for a campaign has been accepted by selecting accepted button 1316 or rejected by selecting rejection button 1318.

Figure 14:
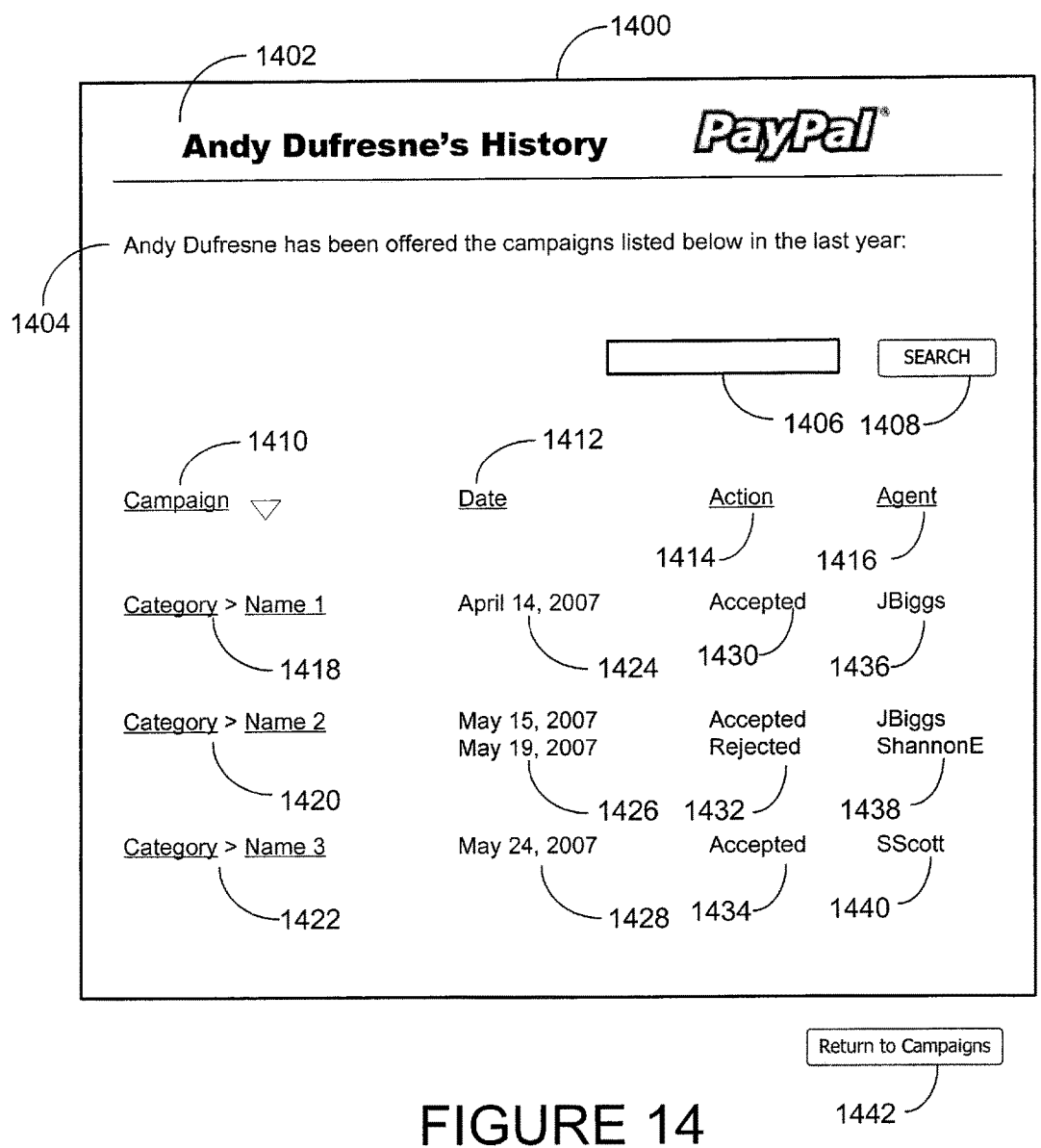

FIG. 14 illustrates an example user interface 1400 that may be provided to an agent to interface with the system 100 through the customer service provider 110 (see FIG. 1). The user interface 1400 may also be used in other systems. In an example embodiment, the user interface 1400 is an example user interface shown to the agent in response to selecting a campaign history of a customer. However, different user interfaces may be shown to the agent in response to selecting the campaign history of the customer.

The user interface 1400 may include an identifier 1402 to identify that the user interface 1400 relates to the campaign history of a particular customer. The agent may also be provided with instructional text 1404 regarding the user interface 1400.

A search field 1406 and a search button 1408 may enable the agent to perform a keyword search for a particular campaign. For example, the agent may search on contextual terms to identify a campaign in the campaign history. Upon performing a search, a row that contains a campaign with one or more keywords may be highlighted.

A campaign column header 1410 may be associated with campaigns 1418-1422 that have been delivered to the customer. The campaign column header 1410 may be used to sort the campaigns 1418-1422 in ascending or descending order. A data column header 1412 may be associated with dates 1424-1428 that the campaigns 1418-1422 were delivered to the customer. An action column header 1414 may be associated with actions 1430-1434 to indicate whether the campaigns 1418-1422 were accepted or rejected on the dates 1424-1428. An agent column header 1416 may be associated with agents 1436-1438 to indicate an agent that delivered an offer associated with the campaigns 1418-1422. A return button 1442 may be used to return the agent to a previous user interface (e.g., the user interface 1200).

FIG. 15 illustrates an example user interface 1500 that may be provided to an agent to interface with the system 100 through the customer service provider 110 (see FIG. 1). The user interface 1500 may also be used in other systems. In an example embodiment, the user interface 1500 is an example user interface shown to the agent in response to selecting a campaign under the direction of the agent. However, different user interfaces may be shown to the agent in response to selecting a campaign.

The user interface 1500 may include an identifier 1502 to identify that the user interface 1500 relates to a list of customers under the direction of the agent. The agent may also be provided with instructional text 1504 regarding the user interface 1500.

A view by campaign selection 1506 may enable the agent to view account information grouped by campaign, while a view by account selection 1508 may enable the agent to view the account information grouped by account.

A name column header 1510 may be associated with account names of account listings 1518-1534. A contact column header 1512 may provide contact information (e.g., a telephone number) for the account listings 1518-1534. A campaigns column header 1514 may provide eligible campaigns for the account listings 1518-1534. A last contacted column 1516 may provide a date with which a customer of the account listings 1518-1534 was last contacted by an agent.

FIG. 16 illustrates an example user interface 1600 that may be provided to an agent to interface with the system 100 through the customer service provider 110 (see FIG. 1). The user interface 1600 may also be used in other systems. In an example embodiment, the user interface 1600 is an example user interface shown to the agent in response to accounts of customers that are eligible for a particular campaign. However, different user interfaces may be shown to the agent in response to selecting the eligible accounts of customers for a campaign.

The user interface 1600 may include an identifier 1602 to identify that the user interface 1600 relates to a list of accounts of customers that are eligible for a campaign. The agent may also be provided with instructional text 1604 regarding the user interface 1600.

The agent may select a view script button 1606 to view a script (e.g., the script may include the suggested opening 1308 and the suggested closing 1310 of FIG. 13). A name column header 1608 may be associated with account names of account listings 1614-1630. A contact column header 1610 may provide contact information (e.g., a telephone number) for the account listings 1614-1630. A last contacted column 1612 may provide a date with which a customer of the account listings 1614-1630 was last contacted by an agent.

Figure 17:
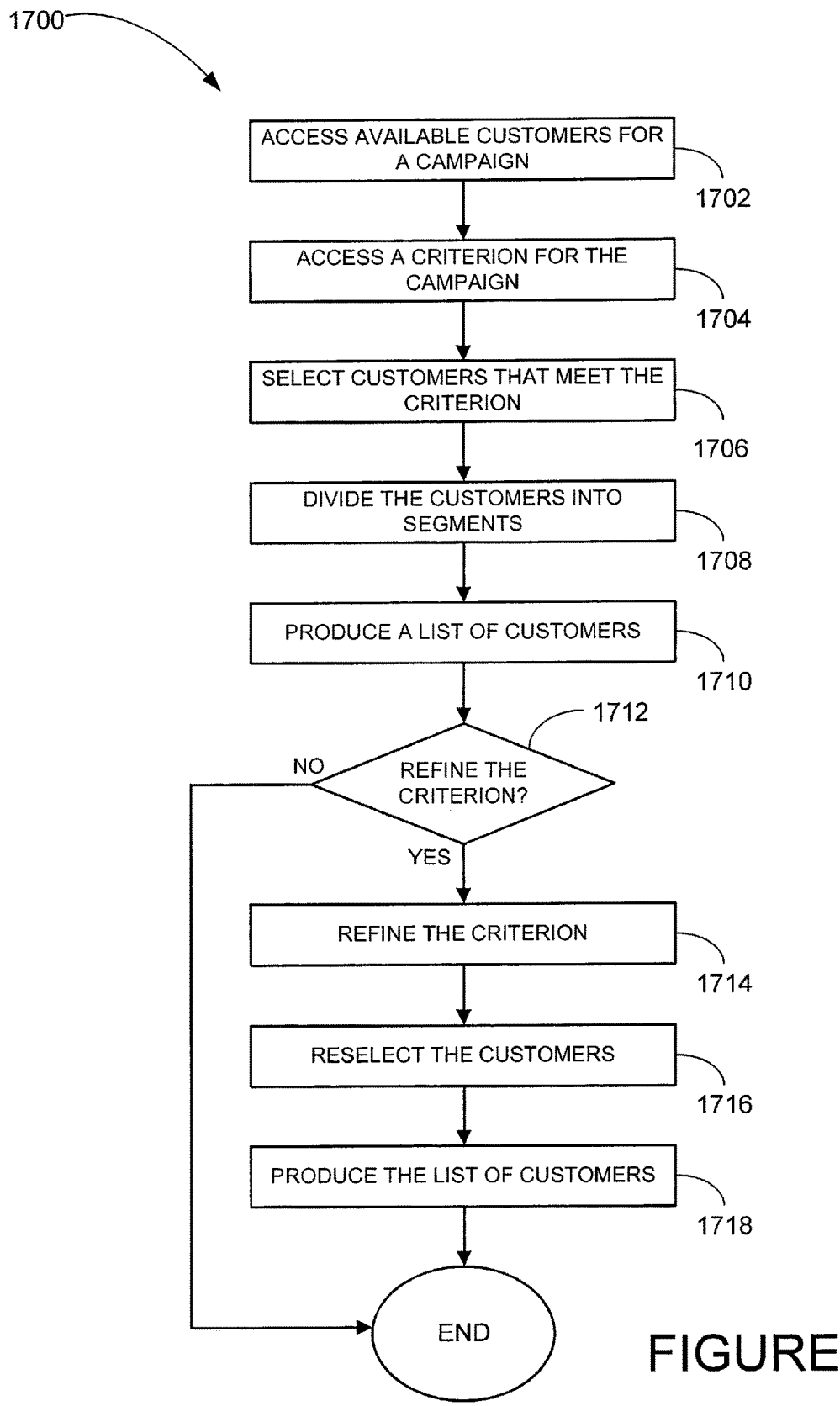
FIG. 17 is a flowchart illustrating a method for producing a list of customers for a campaign according to an example embodiment.

FIG. 17 illustrates a method 1700 for producing a list of customers for a campaign according to an example embodiment. The method 1700 may be performed by the campaign manager 102 (see FIG. 1) or another provider.

Available customers may be accessed for a campaign at block 1702.

A criterion for a campaign may be accessed at block 1704. The criterion may include a product that is already owned by the customer, how long the customer has been a member of a web site or organization, meeting a definition of a good or bad customer, and the like. The operations at block 1702 and block 1704 may occur in any order or simultaneously.

Customers that meet the criterion for the campaign are selected from the available customers at block 1706. The customers may be divided into segments at block 1708. For example, the customers in a first segment of a campaign may not be in a second segment of the campaign.

At block 1710, a list of customers may be produced from the selected customers to receive an offer for the campaign. In an example embodiment, a list of customers may be produced for each of the segments to receive an offer for the campaign. The list of customers may be provided to the filter provider 106 (see FIG. 1) during the operations at block 1710.

A determination may be made at decision block 1712 whether to refine the criterion of the campaign. The criterion may be refined, for example, to add or remove users from a campaign. If a determination is made to refine the criterion, the criterion for the campaign may be refined at block 1714. The customers may be reselected from the available customers that meet the refined criterion for the campaign at block 1716. The list of customers may be produced from the reselected customers to receive the offer for the campaign at block 1718. The list of customers may be provided to the filter provider 106 during the operations at block 1718. If a determination is made not to refine the criterion for the campaign at decision block 1712 or upon completion of the operations at block 1718, the method 1700 may terminate.

Figure 18:
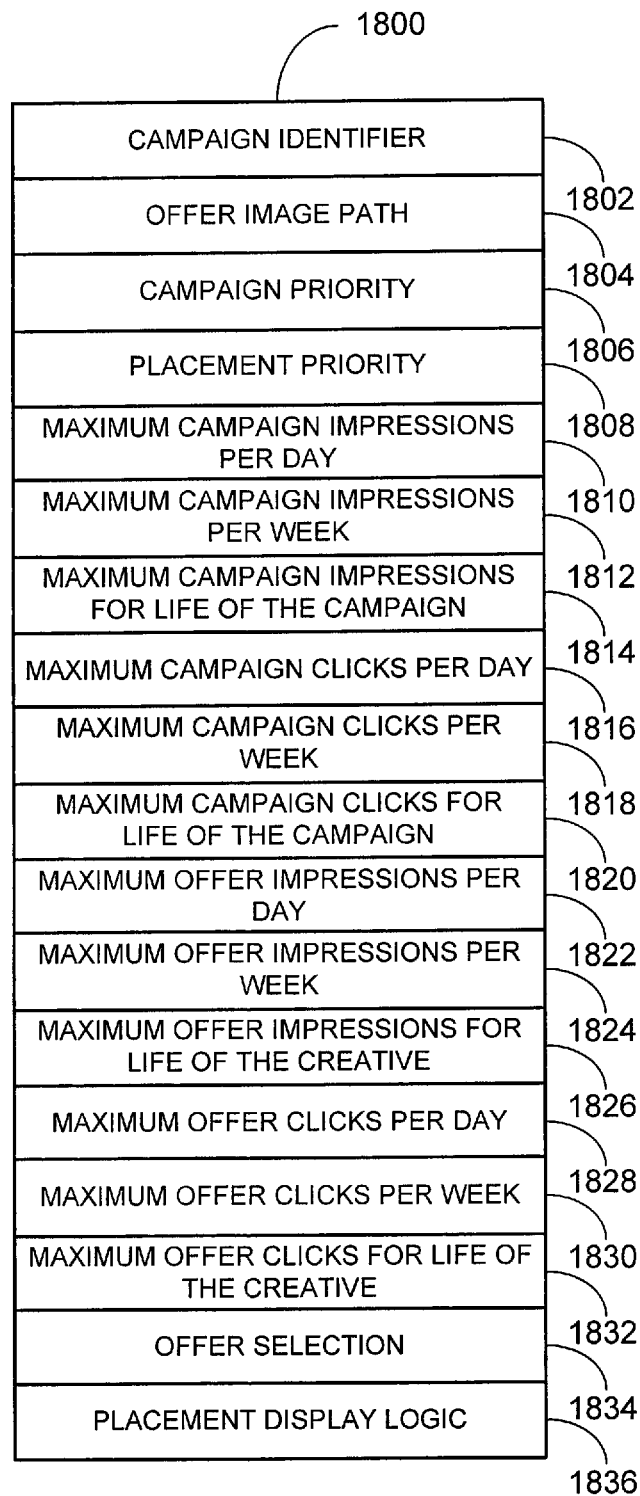
FIGS. 18 and 19 are block diagrams of example metadata of FIG. 1 according to an example embodiment.

FIG. 18 illustrates an example data structure 1800 for the metadata 114 according to an example embodiment. The data structure 1800 may be used as the metadata for an offer of campaign in the system 100 or in another system. For example, the messaging provider 108 may include 108 may include data structures 1800 for the offers of all campaigns.

The data structure 1800 may include a campaign identifier field 1802, an offer image path field 1804, a campaign priority field 1806, a placement priority field 1808, a maximum campaign impressions per day field 1810, a maximum campaign impressions per week field 1812, a maximum campaign impressions per life of the campaign field 1814, a maximum campaign clicks per day field 1816, a maximum campaign clicks per week field 1818, a maximum campaign clicks per life of the campaign field 1820, a maximum offer impressions per day field 1822, a maximum offer impressions per week field 1824, a maximum offer impressions per life of the offer field 1826, a maximum offer clicks per day field 1828, a maximum offer clicks per week field 1830, a maximum offer clicks per life of the offer field 1832, an offer selection field 1834, and/or a placement display logic field. Other fields may also be used.

The campaign identifier field 1802 receives an identifier used to identify the campaign from which the offer is associated from among other campaigns.

The campaign priority field 1806 receives a value associated with a campaign that determines the campaign's relative importance to another campaign. For example, a ranking of one to ten may be used, where a ranking of one is the highest value and a ranking of ten is a lowest value.

The placement priority field 1808 receives a value that may be used to determine which placement should be used among a number of available placements for a web page. For example, a best placement on a web page may be filled first, a next best placement on the web page may be filled second, and so on.

The placement display logic field 1836 receives a value to limit a number of offers of one or more offer types on a web page. For example, only one of a certain type of offer may be provided on the web page, and remaining available positions on the web page may be provided with other offers.

The maximum campaign impressions per day field 1810 receives a value indicating a maximum number of campaign impressions (e.g., a cap of the number of views by the customer or all customers in aggregate in the campaign) that may be provided to the customer in a day. The maximum campaign impressions per week field 1812 receives a value indicating a maximum number of campaign impressions that may be provided to the customer in a week. The maximum campaign impressions per life of the campaign field 1814 receives a value indicating a maximum number of campaign impressions that may be provided to the customer over a lifetime of a campaign.

The maximum campaign clicks per day field 1816 receives a value indicating a maximum number of campaign clicks (e.g., selections by the customers or all customers in aggregate in the campaign) that may be provided to the customer in a day. The maximum campaign clicks per week field 1818 receives a value indicating a maximum number of campaign clicks that may be provided to the customer in a week. The maximum campaign clicks per life of the campaign field 1820 receives a value indicating a maximum number of campaign clicks that may be provided to the customer over the lifetime of a campaign.

The maximum offer impressions per day field 1822 receives a value indicating a maximum number of offer impressions (e.g., views by the customer or all customers in aggregate in a campaign) that may be provided to the customer in a day. The maximum offer impressions per week field 1824 receives a value indicating a maximum number of offer impressions that may be provided to the customer in a week. The maximum offer impressions per life of the offer field 1826 receives a value indicating a maximum number of offer impressions that may be provided to the customer in a lifetime of the offer.

The maximum offer clicks per day field 1828 receives a value indicating a maximum number of offer clicks (e.g., selections by the customer or all customers in aggregate that receive the offer) that may be provided to the customer in a day. The maximum offer clicks per week field 1830 receives a value indicating a maximum number of offer clicks that may be provided to the customer in a week. The maximum offer clicks per life of the offer field 1832 receives a value indicating a maximum number of offer clicks that may be provided to the customer in a lifetime of the offer.

The offer selection field 1834 receives a value indicating whether an offer has been accepted or rejected. In an example embodiment, one or more of the fields of the data structure 1800 may be used to minimize fatigue of a customer and rotate prioritized offers to increase an acceptance rate of the offer by the customer.

In an example embodiment, the metadata relating to an offer may be for a user, while the metadata for the campaign may be for all users in aggregated for a campaign. However, other configurations of the metadata may also be used.

Figure 19:
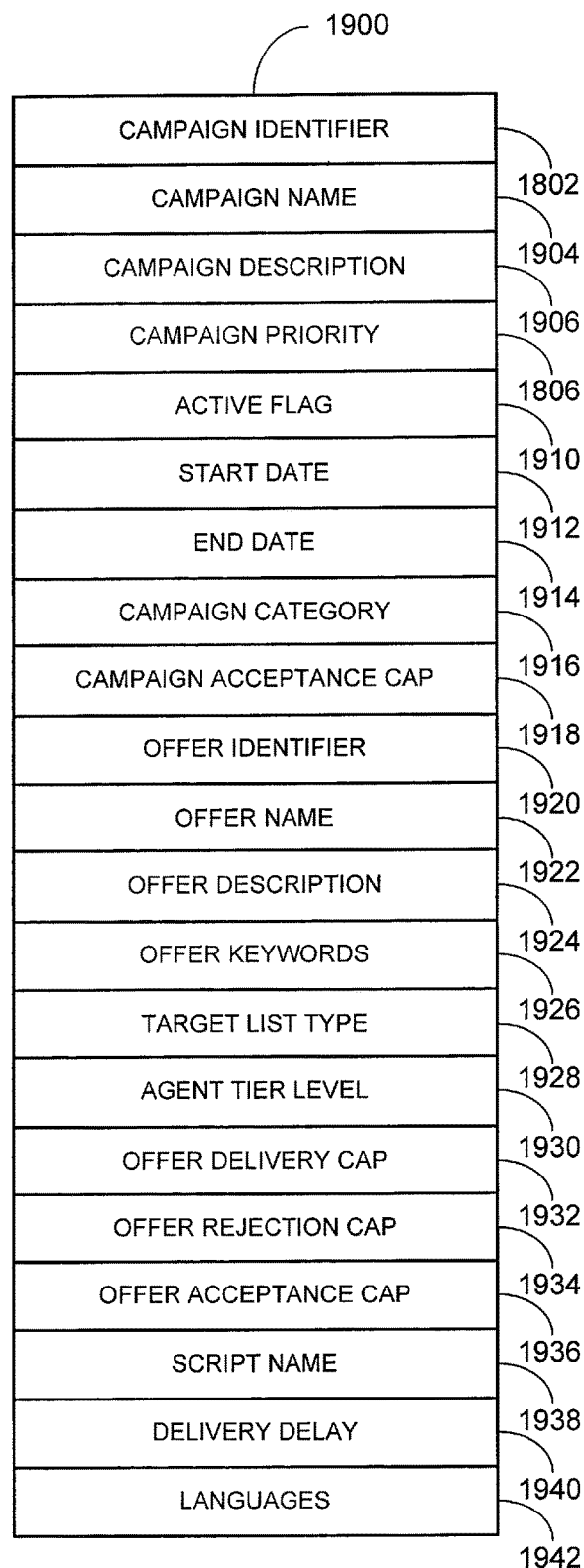

FIG. 19 illustrates an example data structure 1900 for the metadata 114 according to an example embodiment. The data structure 1900 may be used as the metadata for an offer of campaign in the system 100 or in another system. For example, the customer service provider 110 may include data structures 1900 for the offers of all campaigns.

The data structure 1900 may include the campaign identifier field 1802, a campaign name field 1904, a campaign description field 1906, the campaign priority field 1806, an active flag field 1910, a start date field 1912, an end date field 1914, a campaign category field 1916, a campaign acceptance cap field 1918, an offer identifier field 1920, an offer name field 1922, an offer description field 1924, an offer keywords field 1926, a target list type field 1928, an agent tier level field 1930, an offer delivery cap field 1932, an offer rejection cap field 1934, an offer acceptance cap field 1936, a script name field 1938, a delivery delay field 1940, and/or a languages field 1942. Other fields may also be used.

The campaign name field 1904 receives a name of a campaign. The campaign description field 1906 receives a description of a campaign.

The active flag field receives an indication of whether or not a campaign is active. The start date field 1912 receives a start date of a campaign. The end date field 1914 receives an end date of a campaign.

The campaign category field 1916 retains a category under which a campaign is organized. For example, the campaign category field 1916 may include a value of "COMPLIANCE", "EDUCATION", "RETENTION", or "SALES", however other values related to different categories may also be received.

The campaign acceptance cap field 1918 receives a maximum number of times a campaign may be accepted (e.g., by the customer or aggregate across all customers in a campaign).

The offer identifier field 1920 receives an identifier for an offer associated with a campaign.

The offer name field 1922 receives a name of an offer associated with a campaign.

The offer description field 1924 receives a description of an offer associated with a campaign.

The offer keywords field 1926 receives one or more keywords that may be used to search for a campaign.

The target list type field 1928 receives a value indicating whether customer identifiers associated with an offer is targeted or non-targeted. The value may also indicate whether or not the explicit list 116 is used with the campaign.

The agent tier level field 1930 may indicate an agent tier level of which agents at or below the level are qualified to deliver an offer.

The offer delivery cap field 1932 receives a value indicating a number of times the offer may be delivered. For example, a retention campaign may be delivered multiple times, a sales campaign may be delivered once, or the like.

The offer rejection cap field 1934 receives a value indicating a number of times an offer may be rejected (e.g., over a lifetime of a campaign).

The offer acceptance cap field 1936 receives a value indicating a number of times an offer may be accepted (e.g., over a lifetime of a campaign).

The script name field 1938 includes a URL or other locator of a script file that is presented to the agent and may be delivered to the customer.

The delivery delay field 1940 receives a value indicating a minimum number of days for which an already delivered offer may be suppressed before allowing the agent to deliver the offer again.

The languages field 1942 receives a list of languages in which the offer is available.

Figure 20:
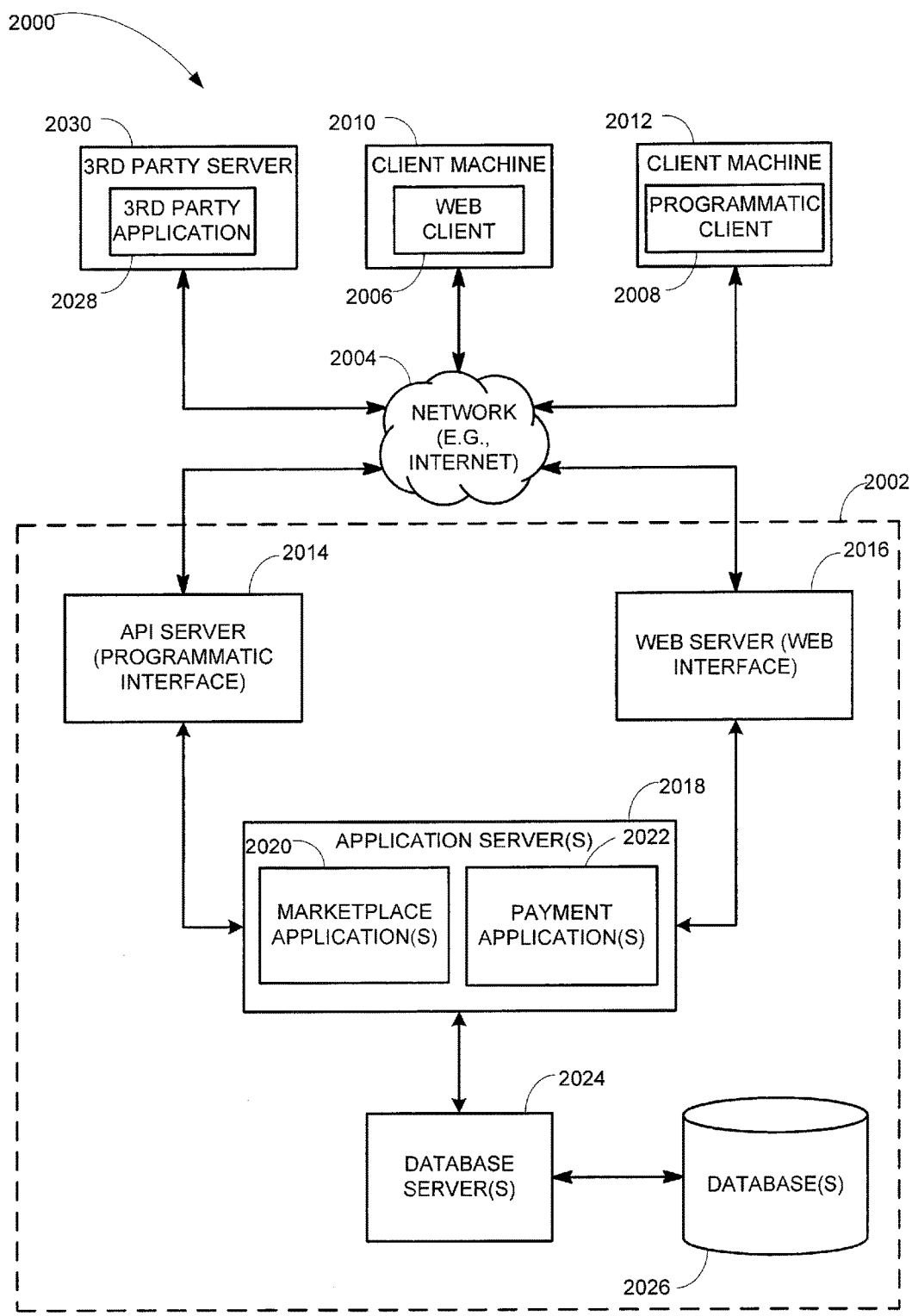
FIG. 20 is a network diagram depicting a network system, according to one embodiment, having a client server architecture configured for exchanging data over a network.

FIG. 20 is a network diagram depicting a client-server system 2000, within which one example embodiment may be deployed. For example, the system 100 (see FIG. 1) may be deployed with the client-server system 2000 (e.g., where the customer machine 128 is a client machine 2010) or another system.

A networked system 2002, in the example forms of a network-based marketplace or publication system, provides server-side functionality, via a network 2004 (e.g., the Internet or Wide Area Network (WAN)) to one or more clients. FIG. 20 illustrates, for example, a web client 2006 (e.g., a browser, such as the Internet Explorer browser developed by Microsoft Corporation of Redmond, Wash. State), and a programmatic client 2008 executing on respective client machines 2010 and 2012.

An Application Program Interface (API) server 2014 and a web server 2016 are coupled to, and provide programmatic and web interfaces respectively to, one or more application servers 2018. The application servers 2018 host one or more marketplace applications 2020 and payment applications 2022. The application servers 2018 are, in turn, shown to be coupled to one or more databases servers 2024 that facilitate access to one or more databases 2026.

The marketplace applications 2020 may provide a number of marketplace functions and services to users that access the networked system 2002. The payment applications 2022 may likewise provide a number of payment services and functions to users. The payment applications 2022 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 2020. While the marketplace and payment applications 2020 and 2022 are shown in FIG. 20 to both form part of the networked system 2002, in alternative embodiments the payment applications 2022 may form part of a payment service that is separate and distinct from the networked system 2002.

Further, while the system 2000 shown in FIG. 20 employs a client-server architecture, the present invention is of course not limited to such an architecture, and could equally well find application in a distributed, or peer-to-peer, architecture system, for example. The various marketplace and payment applications 2020 and 2022 could also be implemented as standalone software programs, which need not have networking capabilities.

The web client 2006 accesses the various marketplace and payment applications 2020 and 2022 via the web interface supported by the web server 2016. Similarly, the programmatic client 2008 accesses the various services and functions provided by the marketplace and payment applications 2020 and 2022 via the programmatic interface provided by the API server 2014. The programmatic client 2008 may, for example, be a seller application (e.g., the TurboLister™ application developed by eBay Inc., of San Jose, Calif.) to enable sellers to author and manage listings on the networked system 2002 in an off-line manner, and to perform batch-mode communications between the programmatic client 2008 and the networked system 2002.

FIG. 20 also illustrates a third party application 2028, executing on a third party server machine 2030, as having programmatic access to the networked system 2002 via the programmatic interface provided by the API server 2014. For example, the third party application 2028 may, utilizing information retrieved from the networked system 2002, support one or more features or functions on a website hosted by the third party. The third party may, for example, provide one or more promotional, marketplace or payment functions that are supported by the relevant applications of the networked system 2002.

Figure 21:
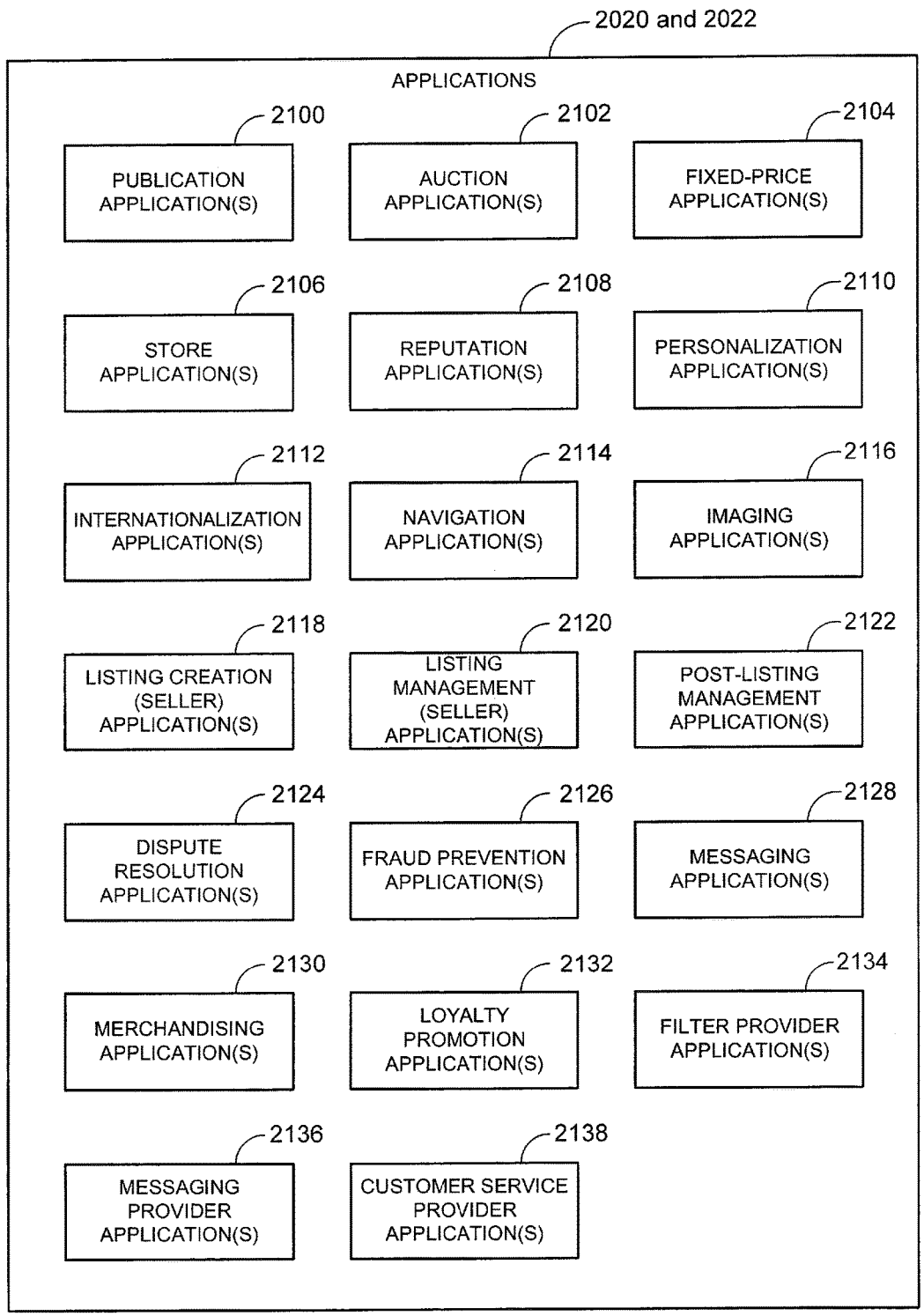
FIG. 21 is a block diagram illustrating an example embodiment of multiple network and marketplace applications, which are provided as part of the network-based marketplace.

FIG. 21 is a block diagram illustrating multiple applications 2020 and 2022 that, in one example embodiment, are provided as part of the networked system 2002 (see FIG. 20). The applications 2020 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 2026 via the database servers 2024.

The networked system 2002 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 2020 are shown to include at least one publication application 2100 and one or more auction applications 2102 which support auction-format listing and price setting mechanisms (e.g., English, Dutch, Vickrey, Chinese, Double, Reverse auctions etc.). The various auction applications 2102 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 2104 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 2106 allow a seller to group listings within a "virtual" store, which may be branded and otherwise personalized by and for the seller. Such a virtual store may also offer promotions, incentives and features that are specific and personalized to a relevant seller.

Reputation applications 2108 allow users that transact, utilizing the networked system 2002, to establish, build and maintain reputations, which may be made available and published to potential trading partners. Consider that where, for example, the networked system 2002 supports person-to-person trading, users may otherwise have no history or other reference information whereby the trustworthiness and credibility of potential trading partners may be assessed. The reputation applications 2108 allow a user, for example through feedback provided by other transaction partners, to establish a reputation within the networked system 2002 over time. Other potential trading partners may then reference such a reputation for the purposes of assessing credibility and trustworthiness.

Personalization applications 2110 allow users of the networked system 2002 to personalize various aspects of their interactions with the networked system 2002. For example a user may, utilizing an appropriate personalization application 2110, create a personalized reference page at which information regarding transactions to which the user is (or has been) a party may be viewed. Further, a personalization application 2110 may enable a user to personalize listings and other aspects of their interactions with the networked system 2002 and other parties.

The networked system 2002 may support a number of marketplaces that are customized, for example, for specific geographic regions. A version of the networked system 2002 may be customized for the United Kingdom, whereas another version of the networked system 2002 may be customized for the United States. Each of these versions may operate as an independent marketplace, or may be customized (or internationalized and/or localized) presentations of a common underlying marketplace. The networked system 2002 may accordingly include a number of internationalization applications 2112 that customize information (and/or the presentation of information) by the networked system 2002 according to predetermined criteria (e.g., geographic, demographic or marketplace criteria). For example, the internationalization applications 2112 may be used to support the customization of information for a number of regional websites that are operated by the networked system 2002 and that are accessible via respective web servers 2016.

Navigation of the networked system 2002 may be facilitated by one or more navigation applications 2114. For example, a search application (as an example of a navigation application) may enable key word searches of listings published via the networked system 2002. A browse application may allow users to browse various category, catalogue, or system inventory structures according to which listings may be classified within the networked system 2002. Various other navigation applications may be provided to supplement the search and browsing applications.

In order to make listings available via the networked system 2002 as visually informing and attractive as possible, the marketplace applications 2020 may include one or more imaging applications 2116 utilizing which users may upload images for inclusion within listings. An imaging application 2116 also operates to incorporate images within viewed listings. The imaging applications 2116 may also support one or more promotional features, such as image galleries that are presented to potential buyers. For example, sellers may pay an additional fee to have an image included within a gallery of images for promoted items.

Listing creation applications 2118 allow sellers conveniently to author listings pertaining to goods or services that they wish to transact via the networked system 2002, and listing management applications 2120 allow sellers to manage such listings. Specifically, where a particular seller has authored and/or published a large number of listings, the management of such listings may present a challenge. The listing management applications 2120 provide a number of features (e.g., auto-relisting, inventory level monitors, etc.) to assist the seller in managing such listings. One or more post-listing management applications 2122 also assist sellers with a number of activities that typically occur post-listing. For example, upon completion of an auction facilitated by one or more auction applications 2102, a seller may wish to leave feedback regarding a particular buyer. To this end, a post-listing management application 2122 may provide an interface to one or more reputation applications 2108, so as to allow the seller conveniently to provide feedback regarding multiple buyers to the reputation applications 2108.

Dispute resolution applications 2124 provide mechanisms whereby disputes arising between transacting parties may be resolved. For example, the dispute resolution applications 2124 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 2126 implement fraud detection and prevention mechanisms to reduce the occurrence of fraud within the networked system 2002.

Messaging applications 2128 are responsible for the generation and delivery of messages to users of the networked system 2002, such messages for example advising users regarding the status of listings at the networked system 2002 (e.g., providing "outbid" notices to bidders during an auction process or to provide promotional and merchandising information to users). Respective messaging applications 2128 may utilize any one have a number of message delivery networks and platforms to deliver messages to users. For example, messaging applications 2128 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 2130 support various merchandising functions that are made available to sellers to enable sellers to increase sales via the networked system 2002. The merchandising applications 2130 also operate the various merchandising features that may be invoked by sellers, and may monitor and track the success of merchandising strategies employed by sellers.

The networked system 2002 itself, or one or more parties that transact via the networked system 2002, may operate loyalty programs that are supported by one or more loyalty/promotions applications 2132. For example, a buyer may earn loyalty or promotions points for each transaction established and/or concluded with a particular seller, and be offered a reward for which accumulated loyalty points can be redeemed.

A filter provider application 2134 may implement the functionality of the filter provider 106, a messaging provider application 2136 may implement the functionality of the messaging provider 108, and the customer service provider application 2138 may implement the functionality of the customer service provider 110.

Figure 22:
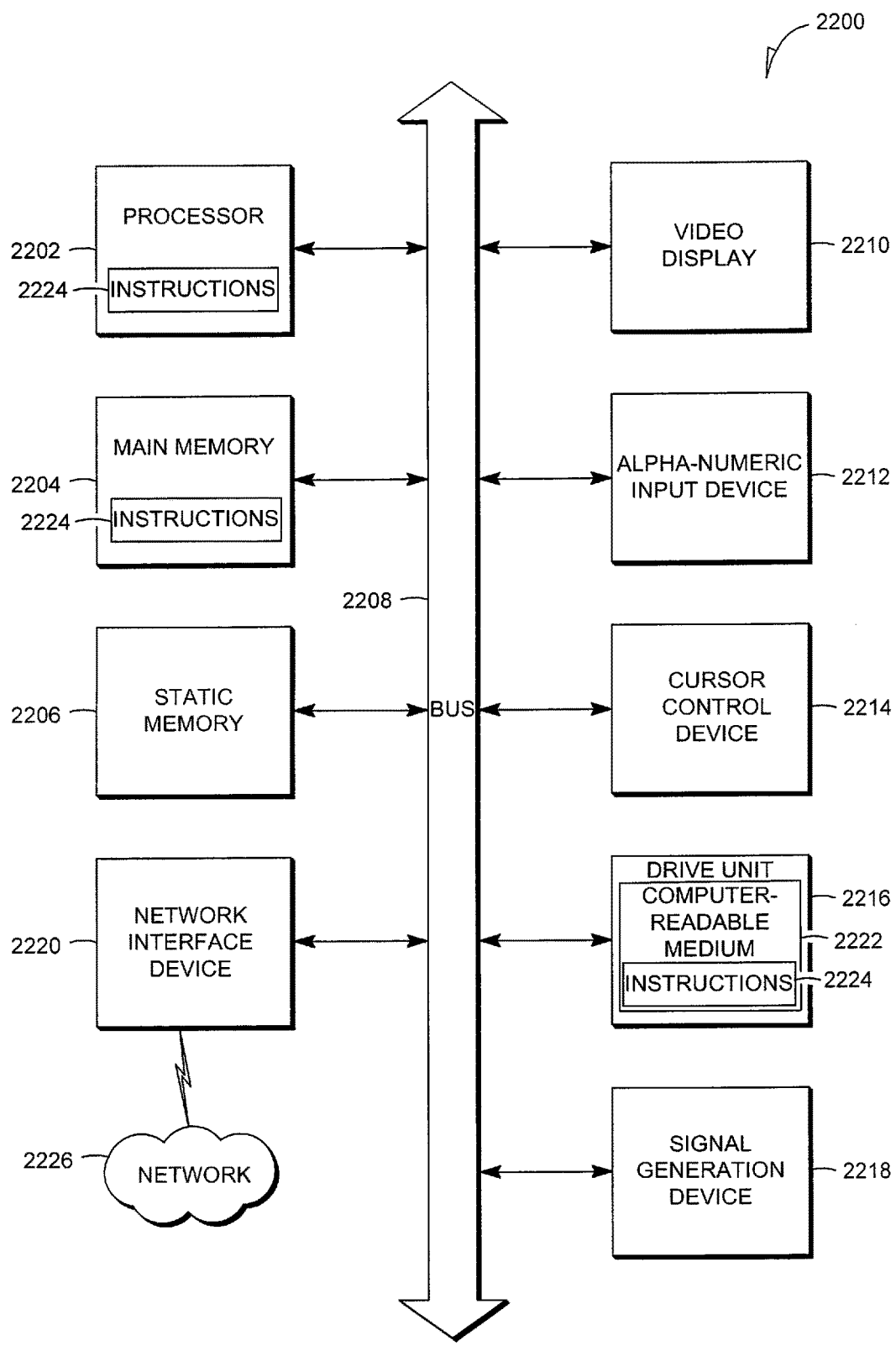
FIG. 22 is a block diagram diagrammatic representation of machine in the example form of a computer system within which a set of instructions for causing the machine to perform any one or more of the methodologies discussed herein may be executed.

FIG. 22 shows a diagrammatic representation of machine in the example form of a computer system 2200 within which a set of instructions may be executed causing the machine to perform any one or more of the methods, processes, operations, or methodologies discussed herein. The campaign manager 102, the filter provider 106, the messaging provider 108, and/or the customer service provider 110 (see FIG. 1) may operate on or more computer systems 2200.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2200 includes a processor 2202 (e.g., a central processing unit (CPU) a graphics processing unit (GPU) or both), a main memory 2204 and a static memory 2206, which communicate with each other via a bus 2208. The computer system 2200 may further include a video display unit 2210 (e.g., a liquid crystal display (LCD) or a cathode ray tube (CRT)). The computer system 2200 also includes an alphanumeric input device 2212 (e.g., a keyboard), a cursor control device 2214 (e.g., a mouse), a drive unit 2216, a signal generation device 2218 (e.g., a speaker) and a network interface device 2220.

The drive unit 2216 includes a machine-readable medium 2222 on which is stored one or more sets of instructions (e.g., software 2224) embodying any one or more of the methodologies or functions described herein. The software 2224 may also reside, completely or at least partially, within the main memory 2204 and/or within the processor 2202 during execution thereof by the computer system 2200, the main memory 2204 and the processor 2202 also constituting machine-readable media.

The software 2224 may further be transmitted or received over a network 2226 via the network interface device 2220.

While the machine-readable medium 2222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for dynamic messaging have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a lookup request, the lookup request including a customer identifier of a customer;
creating a compressed filter by hashing a list of customer identifiers into a data structure using a hash function and a hash table, the compressed filter representing the list of customer identifiers associated with the available offer compressed to a reduced storage size of at least sixty percent as compared to the list of customer identifiers that are uncompressed;
tuning a filter matching system based on a tunable error rate introduced by the compressed filter, the error rate indicating an incorrect match between the customer identifier and the compressed filter, the error rate being between 0.1 and 0.0001 percent, and the error rate selected based on an amount of compression gained in creating the compressed filter;
determining, in real-time using the filter matching system, a plurality of eligible campaigns for the customer, an eligible campaign of the plurality of eligible campaigns including an available offer for the customer, the determining of the plurality of eligible campaigns for the customer being based on a matching of the customer identifier with the compressed filter of the available offer of the plurality of eligible campaigns;
selecting the available offer of a campaign from the determined plurality of eligible campaigns based on metadata of the plurality of eligible campaigns, campaign history data of the customer, and customer data of the customer, the customer data of the customer comprising at least one of information about items purchased by the customer, information about an amount paid by the customer, information about a web site with which the customer is associated, and product ownership information of the customer; and
providing, subsequent to the selecting of the available offer, a message associated with the selected offer, the message being presented to the customer.

2. The method of claim 1, further comprising storing indicia that the message was provided for the customer in the campaign history data of the customer.

3. The method of claim 1, further comprising modifying the metadata associated with at least one of the plurality of eligible campaigns, and where the lookup request is related to the customer identifier of the customer.

4. The method of claim 1, further comprising determining that the customer identifier of the customer meets an explicit list for the campaign of the selected offer.

5. The method of claim 1, further comprising:
determining that the customer identifier of the customer meets an explicit list for the campaign of the selected offer, the explicit list including a list of identifiers of customers in the campaign of the selected offer;
based on the determination, selecting an available offer of a different campaign from the plurality of eligible campaigns based on metadata of the plurality of eligible campaigns and the campaign history data of the customer; and
providing a further message, the further message associated with the selected offer of the different campaign.

6. The method of claim 1, wherein the message is an educational message, a sales message, a compliance message, a retention message, or a combination thereof.

7. The method of claim 1, wherein the compressed filter of the eligible campaign is retained in memory of a computing device during determination of the plurality of eligible campaigns for the customer.

8. The method of claim 1, wherein the compressed filter is a Bloom filter.

9. The method of claim 1, wherein the selected offer is a targeted offer for the customer.

10. The method of claim 1, wherein the metadata of the campaign includes a campaign priority, a placement priority, a maximum number of campaign impressions per day, a maximum number of campaign impressions per week, a maximum number of campaign impressions per life of the campaign, a maximum number of campaign clicks per day, a maximum number of campaign clicks per week, a maximum number of campaign clicks per life of the campaign, a maximum number of offer impressions per day, a maximum number of offer impressions per week, a maximum number of offer impressions per life of the offer, a maximum number of offer clicks per day, a maximum offer clicks per week, a maximum number of offer clicks per life of the offer, or a combination thereof.

11. The method of claim 1, wherein a lookup request is received in response to the customer visiting a web page.

12. The method of claim 1, wherein providing comprises:
determining a placement in a web page for the message associated with the selected offer;
accessing a messaging image in accordance with the determined placement; and
providing the messaging image associated with the selected offer, the messaging image capable of being presented to the customer at the determined placement in the web page.

13. A method comprising:
accessing a list of customer identifiers for an offer;
hashing the list of customer identifiers into a data structure using a hash function and a hash table to create a compressed filter representing the list of customer identifiers associated with the offer, the compressed filter used to make a determination whether a particular customer identifier is in the list of customer identifiers, and the compressed filter representing the list of customer identifiers associated with the available offer compressed to a reduced storage size of at least sixty percent as compared to the list of customer identifiers that are uncompressed;
receiving a lookup request, the lookup request including the particular customer identifier of a customer;
tuning a filter matching system based on a tunable error rate introduced by the compressed filter, the error rate indicating an incorrect match between the customer identifier and the compressed filter, the error rate being between 0.1 and 0.0001 percent, and the error rate selected based on an amount of compression gained in creating the compressed filter;
determining, in real-time using the filter matching system implemented by the one or more processors, a plurality of eligible campaigns for the customer, an eligible campaign of the plurality of eligible campaigns including an available offer for the customer, the determining of the plurality of eligible campaigns for the customer being based on a matching of the particular customer identifier with the compressed filter of the available offer of the plurality of eligible campaigns; and
selecting the available offer of a campaign from the determined plurality of eligible campaigns based on metadata of the plurality of eligible campaigns, campaign history data of the customer, and customer data of the customer, the customer data of the customer comprising at least one of information about items purchased by the customer, information about an amount paid by the customer, information about a web site with which the customer is associated, and product ownership information of the customer.

14. The method of claim 13, further comprising:
making a determination whether the particular customer identifier matches the compressed filter; and
providing, in response to the determination, a message associated with the offer for the customer.

15. The method of claim 13, further comprising:
accessing an updated list of customer identifiers for the offer; and
hashing the updated list of customer identifiers to create an updated compressed filter representing the updated list of customer identifiers associated with the offer, the updated compressed filter used in place of the compressed filter and used to determine whether the particular customer identifier is in the updated list of customer identifiers.

16. The method of claim 13, wherein a plurality of customers of the list of customer identifiers are in a campaign or a segment of the campaign.

17. The method of claim 13, wherein the list of customer identifiers includes a list of customer e-mail addresses and the lookup request of the particular customer identifier includes a customer e-mail address.

18. The method of claim 13, wherein the compressed filter is a Bloom filter.

19. A method comprising:
receiving a lookup request including a customer identifier of a customer;
creating a compressed filter by hashing a list of customer identifiers into a data structure using a hash function and a hash table, the compressed filter representing the list of customer identifiers associated with the available offer compressed to a reduced storage size of at least sixty percent as compared to the list of customer identifiers that are uncompressed;
tuning a filter matching system based on a tunable error rate introduced by the compressed filter, the error rate indicating an incorrect match between the customer identifier and the compressed filter, the error rate being between 0.1 and 0.0001 percent, and the error rate selected based on an amount of compression gained in creating the compressed filter;
determining, in real-time using the filter matching system, a plurality of eligible campaigns for the customer, an eligible campaign of the plurality of eligible campaigns including an available offer for the customer, the determining of the plurality of eligible campaigns being based on a matching of the customer identifier with the compressed filter of the available offer of the plurality of eligible campaigns while the compressed filter is retained in memory;
selecting the available offer of a campaign from the determined plurality of eligible campaigns based on metadata of the plurality of eligible campaigns, campaign history data of the customer, and customer data of the customer, the customer data of the customer comprising at least one of information about items purchased by the customer, information about an amount paid by the customer, information about a web site with which the customer is associated, and product ownership information of the customer; and
providing, subsequent to the selecting of the available offer, the selected available offer of the plurality of eligible campaigns to an agent of the customer.

20. The method of claim 19, further comprising:
receiving a selection of the available offer of a campaign from the plurality of eligible campaigns; and
storing an indicia regarding the selection in a campaign history data of the customer.

21. The method of claim 19, wherein providing comprises:
accessing metadata of the plurality of eligible campaigns and a campaign history data of the customer; and
providing the available offer of the plurality of eligible campaigns to an agent of the customer in a format based on the metadata and the campaign history data of the customer.

22. The method of claim 21, wherein providing comprises:
modifying the metadata associated with at least one of the plurality of eligible campaigns; and
providing the available offer of the campaign from the plurality of eligible campaigns to the agent based on the modified metadata of the at least one of the plurality of campaigns, unmodified metadata of remaining campaigns of the plurality of campaigns, and campaign history data of the customer.

23. A non-transitory machine-readable medium comprising instructions, which in response to being executed by one or more processors cause performance of operations comprising:
receiving a lookup request including a customer identifier of a customer;

creating a compressed filter by hashing a list of customer identifiers into a data structure using a hash function and a hash table, the compressed filter representing the list of customer identifiers associated with the available offer compressed to a reduced storage size of at least sixty percent as compared to the list of customer identifiers that are uncompressed;

tuning a filter matching system based on a tunable error rate introduced by the compressed filter, the error rate indicating an incorrect match between the customer identifier and the compressed filter, the error rate being between 0.1 and 0.0001 percent, and the error rate selected based on an amount of compression gained in creating the compressed filter;

determining, in real-time using the filter matching system, a plurality of eligible campaigns for the customer, an eligible campaign of the plurality of eligible campaigns including an available offer for the customer, the determining of the plurality of eligible campaigns for the customer being based on a matching of the customer identifier with the compressed filter of the available offer of the plurality of eligible campaigns;

selecting the available offer of a campaign from the determined plurality of eligible campaigns based on metadata of the plurality of eligible campaigns, campaign history data of the customer, and customer data of the customer, the customer data of the customer comprising at least one of information about items purchased by the customer, information about an amount paid by the customer, information about a web site with which the customer is associated, and product ownership information of the customer; and providing, subsequent to the selecting of the available offer, a message associated with the selected offer, the message being presented to the customer.

24. The non-transitory machine-readable medium of claim 23, further comprising storing indicia that the message was provided for the customer in the campaign history data of the customer.

25. A non-transitory machine-readable medium comprising instructions, which in response to being executed by one or more processors cause performance of operations comprising:

accessing a list of customer identifiers for an offer;

hashing the list of customer identifiers into a data structure using a hash function and a hash table to create a compressed filter representing the list of customer identifiers associated with the offer, the compressed filter used to determine whether a particular customer identifier is in the list of customer identifiers, and the compressed filter representing the list of customer identifiers associated with the available offer compressed to a reduced storage size of at least sixty percent as compared to the list of customer identifiers that are uncompressed;

receiving a lookup request, the lookup request including the particular customer identifier of a customer;

tuning a filter matching system based on a tunable error rate introduced by the compressed filter, the error rate indicating an incorrect match between the customer identifier and the compressed filter, the error rate being between 0.1 and 0.0001 percent, and the error rate selected based on an amount of compression gained in creating the compressed filter;

determining, in real-time using the filter matching system, a plurality of eligible campaigns for the customer, an eligible campaign of the plurality of eligible campaigns including an available offer for the customer, the determining of the plurality of eligible campaigns for the customer being based on a matching of the particular customer identifier with the compressed filter of the available offer of the plurality of eligible campaigns; and selecting the available offer of a campaign from the determined plurality of eligible campaigns based on metadata of the plurality of eligible campaigns, campaign history data of the customer, and customer data of the customer, the customer data of the customer comprising at least one of information about items purchased by the customer, information about an amount paid by the customer, information about a web site with which the customer is associated, and product ownership information of the customer.

26. The non-transitory machine-readable medium of claim 25, further comprising:

making a determination whether the particular customer identifier matches the compressed filter; and providing, in response to the determination, a message associated with the offer for the customer.

27. A non-transitory machine-readable medium comprising instructions, which in response to being executed by one or more processors cause performance of operations comprising:

receiving a lookup request including a customer identifier of a customer;

creating a compressed filter by hashing a list of customer identifiers into a data structure using a hash function and a hash table, the compressed filter representing the list of customer identifiers associated with the available offer compressed to a reduced storage size of at least sixty percent as compared to the list of customer identifiers that are uncompressed;

tuning a filter matching system based on a tunable error rate introduced by the compressed filter, the error rate indicating an incorrect match between the customer identifier and the compressed filter, the error rate being between 0.1 and 0.0001 percent, and the error rate selected based on an amount of compression gained in creating the compressed filter;

determining, in real-time using the filter matching system, a plurality of eligible campaigns for the customer, an eligible campaign of the plurality of eligible campaigns including an available offer for the customer, the determining of the plurality of eligible campaigns for the customer being based on a matching of the customer identifier with the compressed filter of the available offer of the plurality of eligible campaigns while the compressed filter is retained in memory;

selecting the available offer of a campaign from the determined plurality of eligible campaigns based on metadata of the plurality of eligible campaigns, campaign history data of the customer, and customer data of the customer, the customer data of the customer comprising at least one of information about items purchased by the customer, information about an amount paid by the customer, information about a web site with which the customer is associated, and product ownership information of the customer; and providing, subsequent to the selecting of the available offer, the selected available offer of the plurality of eligible campaigns to an agent of the customer.

28. The non-transitory machine-readable medium of claim 27, further comprising:

receiving a selection of the available offer of a campaign from the plurality of eligible campaigns; and storing an indicia regarding the selection in a campaign history data of the customer.

29. The method of claim 1, wherein the message is a first message provided at a first point in time over a first network, the method of claim 1 further comprising providing a second message associated with the selected offer at a second point in time later than the first point in time over a second network.

* * * * *